United States Patent [19]
Bruck et al.

[11] Patent Number: 5,513,313
[45] Date of Patent: Apr. 30, 1996

[54] METHOD FOR GENERATING HIERARCHICAL FAULT-TOLERANT MESH ARCHITECTURES

[75] Inventors: Jehoshua Bruck, Palo Alto; Robert E. Cypher, Los Gatos; Ching-Tien Ho, San Jose, all of Calif.

[73] Assignee: International Business Machines Corporation, Armonk, N.Y.

[21] Appl. No.: 521,645

[22] Filed: Aug. 31, 1995

Related U.S. Application Data

[63] Continuation of Ser. No. 4,874, Jan. 19, 1993, abandoned.
[51] Int. Cl.⁶ .................................................. G06F 11/00
[52] U.S. Cl. ...................................................... 395/182.02
[58] Field of Search .................... 395/182.02, 182.01, 395/181, 180, 182.09

[56] References Cited

U.S. PATENT DOCUMENTS

| | | | |
|---|---|---|---|
| 4,047,163 | 9/1977 | Choate et al. | 340/173 R |
| 4,051,354 | 9/1977 | Choate | 235/312 |
| 4,302,819 | 11/1981 | Ware | 364/737 |
| 4,507,726 | 3/1985 | Grinberg et al. | 364/200 |
| 4,605,928 | 8/1986 | Georgiou | 340/825.94 |
| 4,698,807 | 10/1987 | Marwood et al. | 371/11 |
| 4,722,084 | 1/1988 | Morton | 371/9 |
| 4,783,782 | 11/1988 | Morton | 371/11 |
| 4,791,603 | 12/1988 | Henry | 364/900 |
| 4,833,635 | 5/1989 | McCanny et al. | 364/728.01 |
| 4,868,818 | 9/1989 | Madan et al. | 371/11.3 |
| 4,891,810 | 1/1990 | de Corlieu et al. | 371/9.1 |
| 4,907,232 | 3/1990 | Harper et al. | 371/36 |
| 4,918,662 | 4/1990 | Kondo | 365/210 |

(List continued on next page.)

FOREIGN PATENT DOCUMENTS

| | | |
|---|---|---|
| 190813 | 8/1986 | European Pat. Off. . |
| 398971 | 8/1989 | European Pat. Off. . |
| 2231985 | 3/1990 | United Kingdom . |

WO9009635 8/1990 WIPO .

OTHER PUBLICATIONS

Tien et al., Reconfiguring Embedded Task Graphs in Faulty Hypercubes by Automorphisms, System Sciences 1990 Annual Conference, pp. 91–100.

(List continued on next page.)

Primary Examiner—Robert W. Beausoliel, Jr.
Assistant Examiner—Glenn Snyder
Attorney, Agent, or Firm—James C. Pintner; Philip E. Blair

[57] ABSTRACT

A method is disclosed, for use with a multiprocessing hardware mesh architecture including nodes and a network of interconnections between the nodes, for defining and implementing a target logical mesh architecture utilizing a given subset of the nodes and the interconnections of the hardware architecture. Typically, the hardware mesh architecture includes redundant nodes and interconnections, sot hat the target logical mesh architecture may be defined from the hardware architecture several different ways. As a consequence, the target logical mesh architecture may be defined even in the presence of faulty nodes or interconnections in the hardware architecture. Frequently, the logical mesh is defined in terms of some regular pattern of interconnections. The method of the invention facilitates the definition of the desired logical mesh architecture from the hardware architecture, given the possibility that one or more faults are present, by initially defining logical blocks of nodes from among the functional nodes of the hardware architecture. Then, functional edges between the nodes defined within the logical blocks are defined as logical interconnections between the nodes of the logical blocks, such that the logical blocks, with the interconnections, are structurally consistent with portions of the logical mesh. Finally, additional edges are defined as logical interconnections between nodes in different logical blocks, these additional edges also being consistent with the structure of the logical mesh. The result is that the logical mesh has been fully defined from functional nodes and interconnections in the hardware architecture.

11 Claims, 16 Drawing Sheets

U.S. PATENT DOCUMENTS

| | | | |
|---|---|---|---|
| 4,922,408 | 5/1990 | Davis et al. | 364/200 |
| 4,942,517 | 7/1990 | Cok | 364/200 |
| 4,951,220 | 8/1990 | Ramacher et al. | 364/488 |
| 4,970,724 | 11/1990 | Yung | 371/9.1 |
| 5,065,308 | 11/1991 | Evans | 395/800 |
| 5,072,371 | 12/1991 | Benner et al. | 395/200 |
| 5,170,482 | 12/1992 | Shu et al. | 395/800 |
| 5,201,044 | 4/1993 | Frey, Jr. et al. | 395/575 |
| 5,251,131 | 10/1993 | Masand et al. | 364/419.08 |

OTHER PUBLICATIONS

Dutt et al., Designing Fault–Tolerant Systems Using Automorphisms, Journal of Parallel and Distributed Computing, Jul. 1991, pp. 249–268.

Li, "Diagonal Replacement Scheme to Recover Fault in a Mesh", Research Disclosure No. 309, Kenneth Mason Publications, Ltd. England, Jan. 1990.

Kaklamanis et al., "Asymptotically Tight Bounds for Computing with Faulty Array Processors", 31st IEEE Symp., Foundations of Computer Science. pp. 285–296, Oct. 1990.

Kung et al., "Fault–Tolerant Array Processors Using Single––Track Switches", IEEE Trans. Computers, vol. C–38, No. 4, pp. 501–514, Apr. 1989.

Hayes, "A Graph Model for Fault–Tolerant Computing Systems", IEEE Trans. Computers, vol. C–25, No. 9. pp. 875–884, Sep. 1976.

Wong, et al., "Mininum k–Hamiltonian Graphs", Journal of Graph Theory vol. 8, pp. 155–165, 1984.

Paoli et al., "Minimum k–Hamiltonian Graphs II," Journal of Graph Theory vol. 8, pp. 155–165, 1984.

Dutt et al., "On Designing and Reconfiguring k–Fault–Tolerant Tree Architectures", IEEE Trans. Computers, vol. C–39, No. 4, pp. 490–503, Apr. 1990.

Dutt et al., "An Automorphic Approach to the Design of Fault–Tolerant Microprocessors," Proceedings, 19th International Symposium on Fault–Tolerant Computing, pp. 496–503, Jun. 1989.

Bruck et al., "Efficient Fault–Tolerant Meshes and Hypercubes Architectures", IBM Research Report RJ 8566, Jan. 1992.

Bruck et al., "Fault–Tolerant Parallel Architectures with Minimum Numbers of Spares," IBM Research Report RJ 8029, Mar. 1991.

Bruck et al., "Fault–Tolerant Meshes and Hypercubes with Minimum Numbers of Spares," IBM Research Report RJ 8211, Jul. 1991.

Batcher, "Design of a Massively Parallel Processor", IEEE Trans. Computers vol. 9, pp. 836–840, Sep. 1980.

Elspas et al., "Graphs with Circulant Adjacency Matrices", Journal of Combinatorial Theory, vol. 9, pp. 297–307, 1970.

Kuo et al., "Efficient Spare Allocation for Reconfigurable Arrays," IEEE Design and Test, pp. 24–31, Feb. 1987.

Leighton et al., "Wafer Scale Integration of Systolic Arrays," IEEE Trans. Computers, vol. 34, No. 5, (pp. 297–311), May 1985.

Roychowdhury et al., "Efficient Algorithms for Reconfiguration in VLSI/WSI Arrays," IEEE Trans., Computers, vol. C–39, No. 4, pp. 480–489, Apr. 1990.

Rosenberg, "The Diogenes Approach to Testable Fault–Tolerant Arrays of Processors". IEEE Trans. Computers, vol. C–32, No. 10, pp. 802–910, Oct. 1983.

Sami et al., "Reconfigurable Architecture for VLSI Processing Arrays", Proceedings IEEE, vol. 74, No. 5, pp. 712–722, May 1986.

Ueoka et al., "A Defect–Tolerant Design for Full–Wafer Memory LSI", IEEE Journal of Solid–State Circuit, vol. SC–19, No. 3, pp. 319–324, Jun. 1984.

Skerret, "The Terflops", Popular Science, Mar. 1992, pp. 50–55, 88, 89.

J. Bruck et al., Tolerating Faults in a Mesh with a Row of Spare Nodes, RJ 8762 (78576) May 5, 1992.

| LIST 1 | LIST 2 |
|---|---|
| (0,1) | (0,4) |
| (0,2) | (0,5) |
| (1,2) | (1,5) |
| (1,3) | (1,6) |
| (2,3) | (2,6) |
| (2,4) | (2,7) |
| (3,4) | (3,7) |
| (3,5) | (3,8) |
| (4,5) | (4,8) |
| (4,6) | (4,9) |
| (5,6) | (5,9) |
| (5,7) | (5,10) |
| (6,7) | (6,10) |
| (6,8) | (6,11) |
| (7,8) | (7,11) |
| (7,9) | (7,12) |
| (8,9) | (8,12) |
| (8,10) | (8,13) |
| (9,10) | (9,13) |
| (9,11) | (9,14) |
| (10,11) | (10,14) |
| (10,12) | (10,0) |
| (11,12) | (11,0) |
| (11,13) | (11,1) |
| (12,13) | (12,1) |
| (12,14) | (12,2) |
| (13,14) | (13,2) |
| (13,0) | (13,3) |
| (14,0) | (14,3) |
| (14,1) | (14,4) |

*FIG. 3*

PRIOR ART

| 0,0 | 0,1 | 0,2 | 0,3 | 0,4 | 0,5 | 0,6 | 0,7 |
|-----|-----|-----|-----|-----|-----|-----|-----|
| 1,0 | 1,1 | 1,2 | 1,3 | 1,4 | 1,5 | 1,6 | 1,7 |
| 2,0 | 2,1 | 2,2 | 2,3 | 2,4 | 2,5 | 2,6 | 2,7 |
| 3,0 | 3,1 | 3,2 | 3,3 | 3,4 | 3,5 | 3,6 | 3,7 |
| 4,0 | 4,1 | 4,2 | 4,3 | 4,4 | 4,5 | 4,6 | 4,7 |
| 5,0 | 5,1 | 5,2 | 5,3 | 5,4 | 5,5 | 5,6 | 5,7 |

*FIG. 14*

METHOD FOR GENERATING HIERARCHICAL FAULT-TOLERANT MESH ARCHITECTURES

This is a continuation of application Ser. No. 08/004,874 filed on Jan. 19, 1993, now abandoned.

CROSS REFERENCES TO RELATED APPLICATIONS

1. U.S. patent application Ser. No. 07/723,287, filed Jun. 28, 1991, now issued as U.S. Pat. No. 5,280,607.

2. U.S. patent application Ser. No. 07/878,946, filed May 4, 1992, now issued as U.S. Pat. No. 5,271,014.

1. Field of the Invention

Broadly conceived, the present invention relates to methods for generating architectures for massively parallel computers or other elements, and in particular, to methods for generating fault-tolerant d-dimensional mesh architectures.

2. Background History

It is well known in this art to use network architectures in which a plurality of computers, microprocessors, or other elements are linked together to achieve high-speed massively parallel performance characteristics. As such, the mesh is one of the most important parallel architectures.

A mesh architecture may be broadly defined as an architecture including a plurality of nodes and an interconnect structure defined in a specific way. In topological terms, the nodes are laid out in a regular pattern such as a d-dimensional array. Each node is connected to several other nodes in the mesh according to a predetermined connection pattern which holds throughout the mesh architecture. The number of connections per node is called the degree of the mesh. All the inter-node connections together make up the interconnect structure.

One of the most important issues in the design of a system which contains many parallel components is the system's performance in the presence of faults. A fault is generally defined as a component which ceases to perform its function correctly, however defined. Components which are not faulty are generally referred to as being healthy. If one or more components in a parallel system becomes faulty then the system must be reconfigured in the presence of these faults such that the healthy components of the system can continue to perform their required functions. In particular, if the system is required to perform as a mesh and if the system contains faults for which it cannot be reconfigured as a healthy mesh then the system ceases to function correctly and the advantages of parallelism are lost. Therefore, it is vital to this art to have parallel architectures which can be reconfigured to have the same or nearly the same functionality and performance characteristics as a healthy mesh architecture even in the presence of a number of faults.

Two general approaches can be used to obtain such fault-tolerant mesh architectures. The first approach uses a standard mesh architecture to which no additional nodes or edges have been added. The idea with this approach is to functionally mask the effect of one or more faults by simulating the mesh using the healthy components of the mesh. The goal in this technique is to perform reconfiguration in the presence of faults so as to obtain the functionality of a healthy mesh with only a reasonable slowdown factor in performance relative to the performance of the healthy mesh. This approach is described in Kaklamanis et al., "Asymptotically Tight Bounds for Computing with Faulty Arrays of Processors", Proceedings of 31st IEEE Annual Symposium on Foundations of Computer Science, pp. 285–296 (October, 1990). While this approach yields nice theoretical results, the slowdown in performance makes it unattractive in practice and this approach will work only when a component can simultaneously simulate several other components. For example, if the nodes are memory chips, a single component cannot simultaneously simulate multiple memory components.

The second approach adds additional nodes and possibly additional edges and/or switches to the standard mesh architecture. When nodes in the standard mesh architecture become faulty, the additional nodes (called spare nodes) are utilized. A mesh architecture wherein additional nodes as well as extra links and switches are added to the mesh for fault toleration is discussed in Rosenberg, "The Diogenes Approach to Testable Fault-Tolerant VLSI Processor Arrays", IEEE Transactions on Computers, Vol. C-32, No. 10, pp. 902–910 (October, 1983), wherein the idea was to isolate the faults by setting the switches while at the same time maintaining a complete mesh structure with the healthy nodes. However, the concept wherein switches are employed results in the decrease of network performance because, after reconfiguration in the presence of faults, routing has to occur through the switches. Another problem is that the failure of a switch cannot be tolerated in the art because Rosenberg assumes that the switches employed therein are failure free.

These particular problems can be avoided by adding spare nodes and additional edges (but not switches) to a standard mesh architecture so that the resulting architecture is fault-tolerant. When certain components of the fault-tolerant architecture fail, the mesh can be reconfigured so that its healthy components once again form a healthy mesh. Because the fault-tolerant architecture does not require the use of switches, it does not depend on the availability of Rosenberg's fault-free switches and it does not add delays due to routing through switches which decrease network performance.

In general, such fault-tolerant mesh architectures can be described by using a graph model of fault-tolerance wherein the fault-tolerant mesh architecture is represented as a graph and the faults therein are represented by marking the corresponding nodes or edges of the graph. A background discussion on the graph model can be found in Hayes, "A Graph Model for Fault-Tolerant Computing Systems", IEEE Transactions on Computers, Vol. C-25, No. 9, pp. 875–884 (September, 1976), wherein the graph model is introduced but not directed to fault-tolerant meshes. Using this graph model of fault-tolerance, the reconfiguration of the architecture as a mesh corresponds to locating a mesh of unmarked nodes and edges in the graph.

One fault-tolerant mesh architecture utilizing this graph model can be found in Bruck et al., "Method and Apparatus for Tolerating Faults in Mesh Architectures", U.S. patent application Ser. No. 07/723,287, filed: Jun. 28, 1991, wherein it was assumed that the cost of a node was very high and, as such, a fault-tolerant mesh architecture was designed therein with a minimum number of spares. This construction has exactly k-spare nodes which is the same number as the maximum number of faults to be tolerated. As a result, the degree of their fault-tolerant 2-dimensional mesh to tolerate k faults is quite high: $2k+2$ when k is odd; and $2k+4$ when k is even.

In another work, Bruck et al., "Method and Apparatus for Tolerating Faults in a Two-Dimensional Mesh With One Extra Row", U.S. patent application Ser. No. 07/878,946, filed: May 4, 1992, the number of spare nodes was increased to be about k+c, specifically, k+c−2 or k+c−1 depending on whether c is even or odd, in order to tolerate k faults on an (r×c) 2-dimensional mesh. As a result, the degree of the resulting fault-tolerant mesh was reduced to: k+5 when k is odd; and k+6 when k is even.

As a result, another problem in this art of fault-tolerant mesh architectures using a graph model has to do with the cost of the fault-tolerant architecture because both the degree of the architecture and the number of spare nodes in the architecture ultimately contribute to its overall cost in terms of design, development, and implementation. Furthermore, it is clear that any fault-tolerant mesh cannot be utilized unless another healthy mesh can be reconfigured within it in the presence of faults.

Therefore, what is needed in the art is a method for generating fault-tolerant meshes having both a small number of spare nodes and a small degree and the ability to reconfigure a healthy mesh in the presence of faults.

SUMMARY AND OBJECTS OF THE INVENTION

The present invention relates to methods for generating fault-tolerant d-dimensional mesh architectures.

It is a primary object of the present invention to provide a method for generating fault-tolerant mesh architectures that can sustain a large number of fault configurations and still contain a healthy mesh-connected architecture that can be operated with little or no slowdown.

It is another primary object of the present invention to provide a method for generating fault-tolerant architectures which reduces the cost of the generated mesh in terms of the required number of spare nodes and its required degree.

Briefly and to achieve the foregoing objects in accordance with the present invention as embodied and broadly described herein, a method for constructing a fault tolerant mesh M' from a smaller d-dimensional fault tolerant mesh M is disclosed wherein d lists, $(L_1, L_2, \ldots, L_d)$, of ordered pairs of nodes in M are known. Each list $L_i$, where $1 \leq i \leq d$, is the set of edges in M which may be used as dimension-i edges after M has been reconfigured to tolerate faults. The method has the first step of selecting the dimension, d', of the hypercubes in M' where $1 \leq d' \leq d$. Then, create a d'-cube of labeled nodes in M' corresponding to each node in M, wherein each of the labels is a string of d' bits. Thus, M' has $2^{d'}$ times as many nodes as M. For each dimension, i, where $1 \leq i \leq d$, and, for each ordered pair of nodes in list $L_i$ a current d'-cube in M' which corresponds to the first node in the current ordered pair of nodes is in M defined; along with a matching d'-cube in M' which corresponds to the second node in the current ordered pair of nodes in M; and then for each node in the current d'-cube a logical test is performed. If i>d' then a matching node in the matching d'-cube is defined wherein the matching node has the same label as the node in the current d'-cube. And, if the node in the current d'-cube is not already connected to the matching node in the matching d'-cube then an edge is added to connect these two nodes. If i<d' and the i-th bit of the label of the node in the current d'-cube equals 1 then an i-th bit complemented label is obtained by complementing the i-th bit of the label of the node of the current d'-cube; and a matching node in the matching d'-cube is defined wherein the label of the matching node is the i-th bit complemented label obtained in the previous step. If the node in the current d'-cube is not already connected to the matching node in the matching d'-cube then an edge is added to connect these two nodes.

It is an advantage of the present invention to have a method for generating fault-tolerant meshes that can be generalized for use in parallel computers, other parallel architectures, array of chips on boards, WSI arrays, memory chips, and the like.

It is another advantage to generate fault-tolerant meshes that can be reconfigured easily in the presence of faults without the use of switches, i.e., to provide techniques which can efficiently locate a healthy mesh in a fault-tolerant network in the presence of faulty components.

It is another advantage to have a flexible trade-off between the number of spare nodes and the degree of the fault-tolerant d-dimensional mesh.

Additional objects and advantages of the present invention will be set forth in the description which follows, and in part will be obvious from the description or may be learned by the practice of this invention. The objects and advantages of this invention as described herein may be realized and obtained by means particularly pointed out and distinctly claimed in the appended claims taken in conjunction with the accompanying drawings and detailed specification.

BRIEF DESCRIPTION OF THE DRAWINGS

In order that the manner in which the above-recited and other advantages and objects of the present invention are obtained, a more particular description of this invention, briefly described above, will be rendered by reference to a specific embodiment thereof which is illustrated in the appended drawings. Understanding that these drawings depict only a typical embodiment of the present invention and are not therefore to be considered in any way limiting of its scope, this invention will be described and explained with additional specificity and detail through the use of the accompanying drawings, in which:

FIG. 3 is two lists ($L_1$ and $L_2$) of ordered pairs of nodes for the fault-tolerant mesh of FIG. 2;

FIG. 14 is a diagram of the (6×8) target mesh labeled with (row, column) labels.

DETAILED DESCRIPTION OF THE PREFERRED EMBODIMENT

This invention relates to d-dimensional mesh architectures and methods for creating fault-tolerant d-dimensional mesh architectures.

Figure 15:
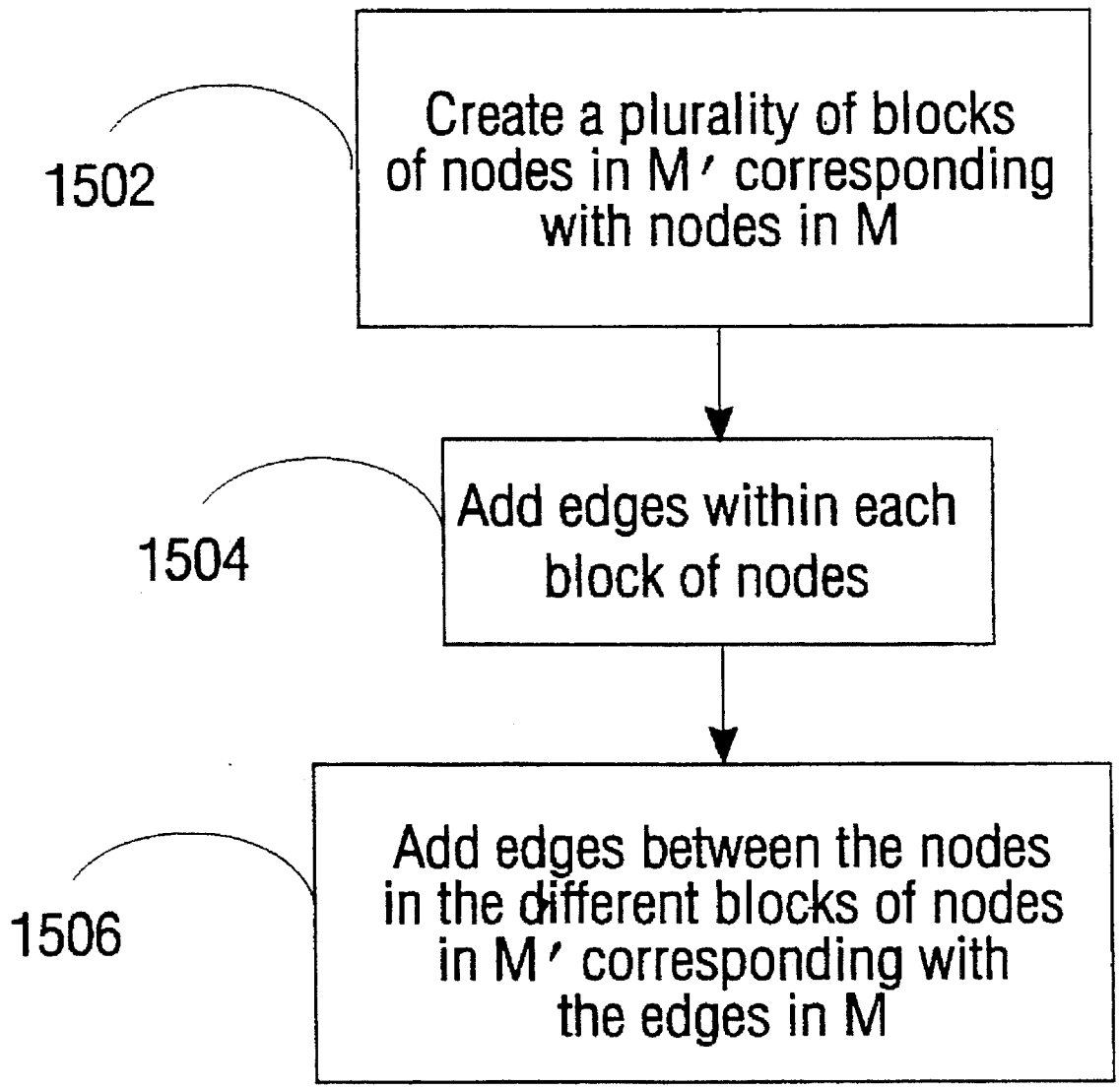
FIG. 15 is a flowchart showing a first embodiment of the method of the invention.

Referring to the flowchart of FIG. 15, a method according to the invention is given for generating a fault-tolerant mesh M' from a d-dimensional fault-tolerant mesh M. As shown in FIG. 15, the method according to the invention comprises the following steps: First, in step 1502, a plurality of blocks of nodes in the fault-tolerant mesh M' is created, the blocks of nodes in corresponding to the nodes in the d-dimensional fault-tolerant mesh M. Next, in step 1504, edges are added within each of the blocks of nodes created in step 1502. Finally, in step 1506, edges are added between the nodes in the different blocks of nodes in the fault-tolerant mesh M', the added edges corresponding to the edges in the d-dimensional fault-tolerant mesh M.

Preferably, the edges added in the step of adding edges (step 1506) form an identical connection pattern in each of the blocks of nodes.

Figure 16:
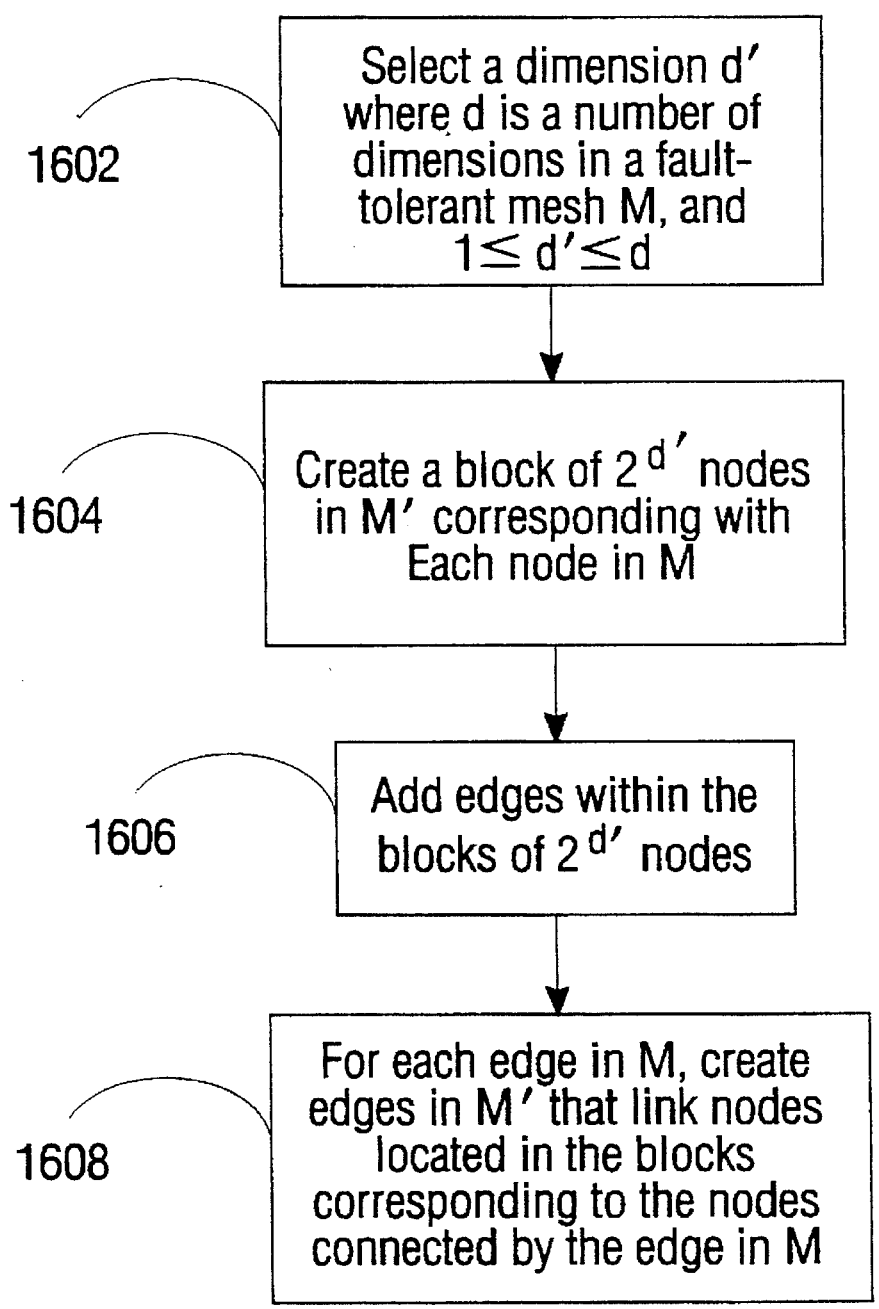
FIG. 16 is a flowchart showing a second embodiment of the method of the invention.

Referring now to the flowchart of FIG. 16, a method according to the invention is given for generating a fault-tolerant mesh M' from a d-dimensional fault-tolerant mesh M. As shown in FIG. 16, the method according to the invention comprises the following steps: First, in step 1602, a dimension d' is selected, where $1 \leq d' \leq d$, that is, where d' is one of the d dimensions of the fault-tolerant mesh M. Then, in step 1604, a block of $2^{d'}$ nodes in M' corresponding to each node in M, is created. Then, in step 1606, edges are added within each of the blocks of $2^{d'}$ nodes created in the step of creating blocks (step 1604). Finally, in step 1608, for each edge in M, edges are created in M' that link nodes, located in the d'-cubes, which correspond to the nodes connected by the respective one of the edges in M.

Preferably, the edges added in the step of adding edges (step 1606) correspond to those edges present in a d'-cube. It is also preferable that the edges added in the step of adding edges (step 1606) comprise the edges present in a d'-cube and diagonal and anti-diagonal edges.

In general, a d-dimensional 2d-connected mesh T of the form $(n_1 \times n_2 \times \ldots \times n_d)$ contains $$n = \prod_{i=1}^{d} n_i$$

nodes. Each node in mesh T is labeled with a unique label of the form $(x_1, x_2, \ldots, x_d)$, where $0 \leq x_i < n_i$. Each node $(x_1, x_2, \ldots, x_d)$ is connected to at most 2d nodes of the form $(x_1, x_2, \ldots, x_i \pm 1, \ldots, x_d)$ provided these nodes exist.

A fault-tolerant d-dimensional mesh architecture is an architecture which, after certain components have failed, can be reconfigured so that the remaining healthy components provide nearly identical functionality of the original healthy d-dimensional mesh architecture. In particular, let k denote the maximum number of faults to be tolerated, let T denote a d-dimensional target mesh of the form $(n_1 \times n_2 \times \ldots \times n_d)$, and let $$n = \prod_{i=1}^{d} n_i$$

be the number of nodes in T. The fault-tolerant graph M containing n+k+s nodes, where $s \geq 0$, is called a k-FT (fault-tolerant) graph for T (or simply a k-FT mesh) if every subgraph of M which consists of n+s nodes contains therein T as a subgraph, i.e., the graph M can tolerate any number of k faults regardless of their distribution and still be guaranteed to contain a copy of the desired healthy mesh T which will be called the target mesh.

The preferred embodiment of this invention is directed to the construction of k-FT meshes based upon a class of graphs known as circulant graphs. A circulant graph is defined herein by specifying X, i.e., the number of nodes which the circulant graph contains, and a set of jumps or offsets. The nodes of the graph are numbered 0 through X-1. Thus, given a set of y offsets, $s_1, s_2, \ldots, s_y$, each node i is connected to the nodes: $(i+s_1) \mod X, (i-s_1) \mod X, (i+s_2) \mod X, (i-s_2) \mod X, \ldots, (i+s_y) \mod X, (i-s_y) \mod X$.

An example of a simple circulant graph is a cycle where there is only one offset and the value of that offset is 1. One skilled in this art should be familiar with circulant graphs and the nodal relationships specific thereto. Further information regarding circulant graphs can be found in Elspas and Turner, "Graphs with Circulant Adjacency Matrices", J. of Combinatorial Theory, No. 9, pp.297–307, (1970).

Figure 1A:
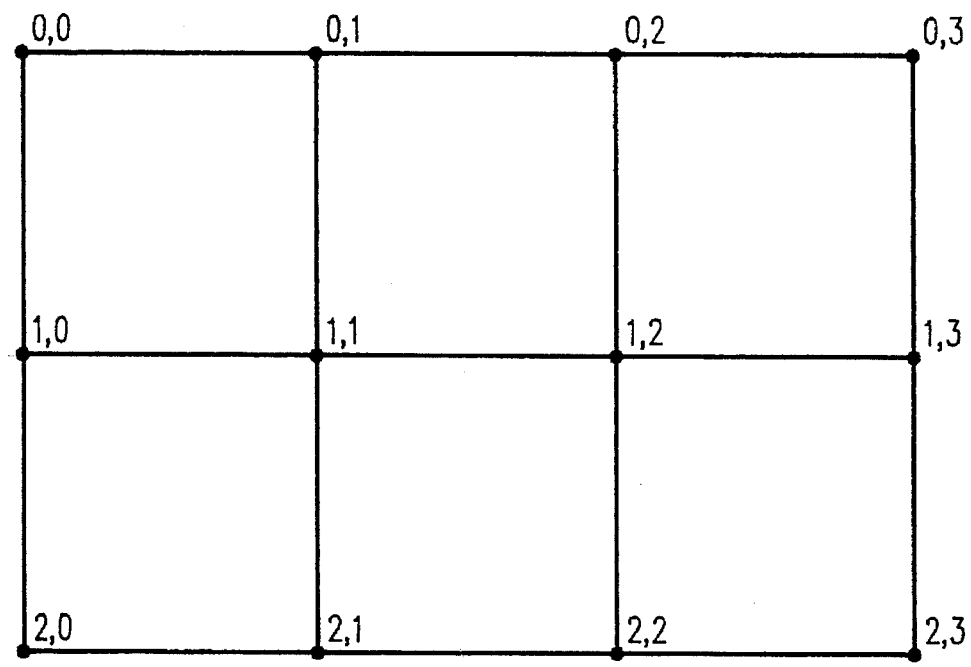
FIG. 1A is a diagram of the prior art illustrating a (3×4) target mesh wherein the nodes of the mesh are labeled with (row, column) labels.
Figure 1B:
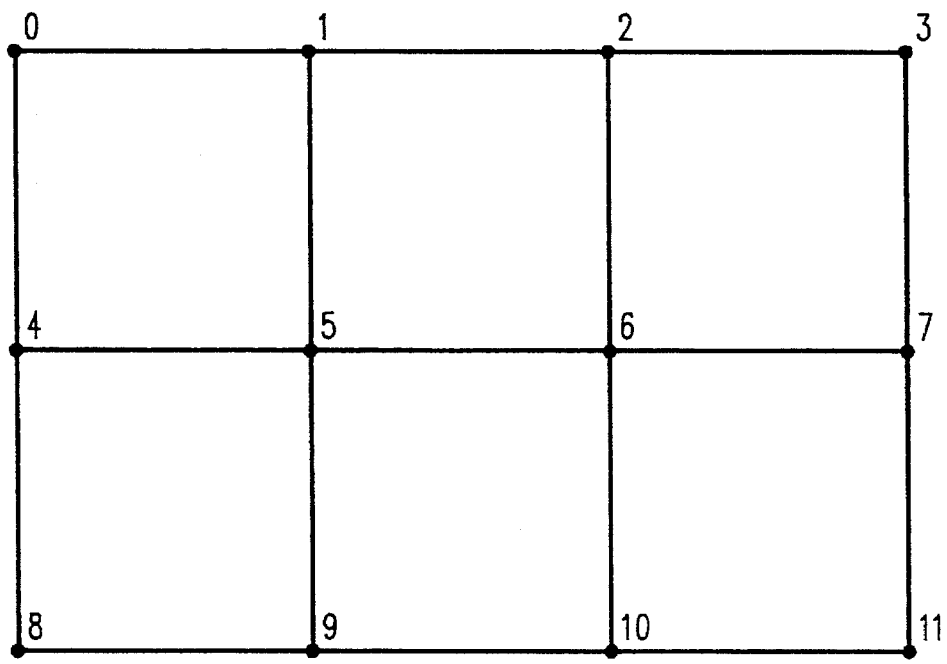
FIG. 1B is a diagram of the prior art illustrating a (3×4) target mesh wherein the nodes of the mesh are labeled in row-major order.

Lastly, the labeling of the nodes in the d-dimensional mesh is important. With reference being made now to FIG. 1A, which is a diagram of the prior art illustrating a 3×4 target mesh, the nodes of the mesh are labeled with row, column labels. In FIG. 1B, a 3×4 target mesh has the nodes labeled in row-major order. In row, column labeling, the rightmost value is the 1-st component and the left value (or the row) is the 2-nd component.

Figure 2:
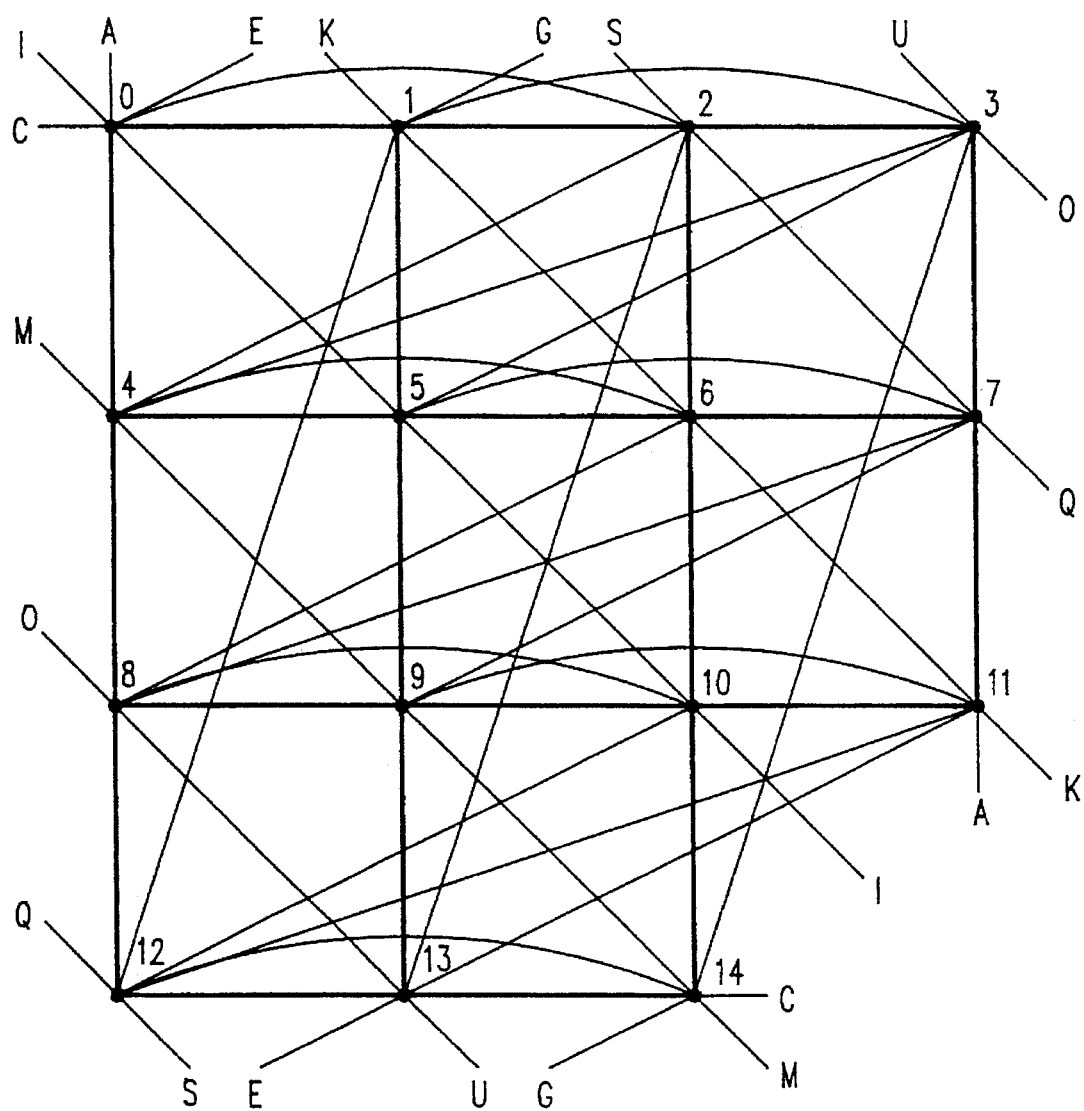
FIG. 2 is a diagram of a prior art 3 fault-tolerant (3×4) mesh.

Reference is now made to FIG. 2 which is a diagram of a prior art 3-FT 3×4 mesh. This 3-FT mesh is a circulant graph as discussed with 15 nodes and with offsets 1,2,4, and 5. By examination of this mesh, the upper lefthand node (or node 0) has an edge to its neighbor on the right (or node 1)

and an edge to node 2, an edge to node 5, an edge to node 4, and edges corresponding to A, E, I, and C. The edge labeled A connects to node 11. The edge labeled I connects to node 10. The edge labeled E connects to node 13 and the edge labeled C connects node 0 to node 14. Thus, edges exist from node 0 to nodes 1,2,5,4,10,11, 13, and 14 respectively. It should be understood that node 0 is physically connected to all these nodes although the alphabetically labeled edges are not shown connected for the sake of clarity of the illustration.

The discussion herein will be directed to taking an existing fault-tolerant mesh M which is a k-FT graph for a d-dimensional target mesh T along with a collection of d lists of ordered pairs associated therewith, and generating another larger d-dimensional fault-tolerant mesh M' which is a k-FT graph for a larger target mesh T'. As such, the example discussed herein, which facilitates the understanding and implementation of the present invention, is therefore specifically directed to creating a fault tolerant graph for the desired target 6×8 mesh (of FIG. 14) from an existing fault tolerant 3×4 mesh (of FIG. 2) and the d=2 lists of ordered pairs (of FIG. 3) associated therewith. As such, the 3-FT mesh M of FIG. 2, which is a 3-FT graph for a 3×4 2-dimensional target mesh T of FIGS. 1A and 1B, serves as a starting point for the present method, in addition to the set of lists of ordered pairs of nodes of FIG. 3. The present method will be applied to obtain a 3-FT mesh M' of FIG. 7, which is a 3-FT graph for a 6×8 2-dimensional target mesh T' of FIG. 14.

Once the starting fault-tolerant mesh, as shown in FIG. 2, has been obtained, the preferred embodiment of the present invention involves first selecting the dimension d' of the hypercubes in M', where $1 \leq d' \leq d$ and where d is the dimension of the starting mesh of FIG. 2. It is advantageous that the choice of d' provides a flexible trade-off between the number of spare nodes and the degree of the fault-tolerant d-dimensional mesh. In particular, larger values of d' require more spare nodes but often result in fault-tolerant mesh architectures with lower degree. For the discussion herein, the selected dimension d' of the hypercube in M' is 2.

Since the dimension of the target mesh T of FIG. 2 is 2, there are 2 corresponding lists, one for each dimension i.e., the first list directly relates to the first dimension (the horizontal dimension) of T and the second list relates to the second dimension (the vertical dimension) of T.

Reference is now made to FIG. 3. Since d=2 denotes the dimension of the target mesh T of FIG. 2, a total of 2 lists are used wherein each list i, where 1<i<d, contains exactly those ordered pairs (x,y) such that an edge connecting nodes x and y exists in the fault-tolerant mesh M and there exists a possible configuration of faults for this fault-tolerant mesh M such that, after reconfiguration of the mesh M given this configuration of faults, the edge connecting node x to node y is utilized as a dimension i edge with node x having a smaller label in dimension-i than node y. In other words, the first list contains all of those ordered pairs (x,y) such that an edge connecting nodes x and y exists in the fault-tolerant mesh M and there exists a possible configuration of faults for this fault-tolerant mesh M such that, after reconfiguration of the mesh M given this configuration of faults, the edge connecting node x to node y is utilized as a horizontal edge with node x having a smaller column label than node y.

In general, the first list consists of all of those ordered pairs (x,y) such that either y=(x+1mod15) or y=(x+2mod15), and that the second list consists of all of the those ordered pairs (x,y) wherein either y=(x+4mod15) or y=(x+5mod15), because the +1 and +2 connections in M are used as positive direction horizontal connections and the +4 and +5 connections in M are used as positive direction vertical connections.

For example, the entry (0,1) of List 1 appears because when nodes 12, 13 and 14 in mesh M are faulty, the mesh M is reconfigured such that the edge connecting nodes 0 and 1 is used as a horizontal edge and node 0 appears in a smaller numbered column than does node 1. On the other hand, there is no (0,4) entry in the first list because the edge connecting nodes 0 and 4 is never used as a horizontal edge regardless of the configuration of faults in M. Furthermore, there is no (1,0) entry in the first list because, when the edge connecting nodes 1 and 0 is used as a horizontal edge, node 1 never appears in a smaller numbered column than does node 0.

Next, a d'-cube (that is, a d'-dimensional hypercube) of labeled nodes in M' corresponding to each node in M is to be generated, wherein each of the labels is a string of d' bits corresponding to hypercube labeling. Thus, since the selected d'=2, the possible hypercube labels are 00, 01, 10, and 11 with the right-most bit defined as the 1-st bit and the leftmost bit defined as the 2-nd bit in the hypercube labeling scheme. Thus, there is an expansion of 4 nodes for each of the nodes of the fault-tolerant mesh of FIG. 2.

Figure 4:
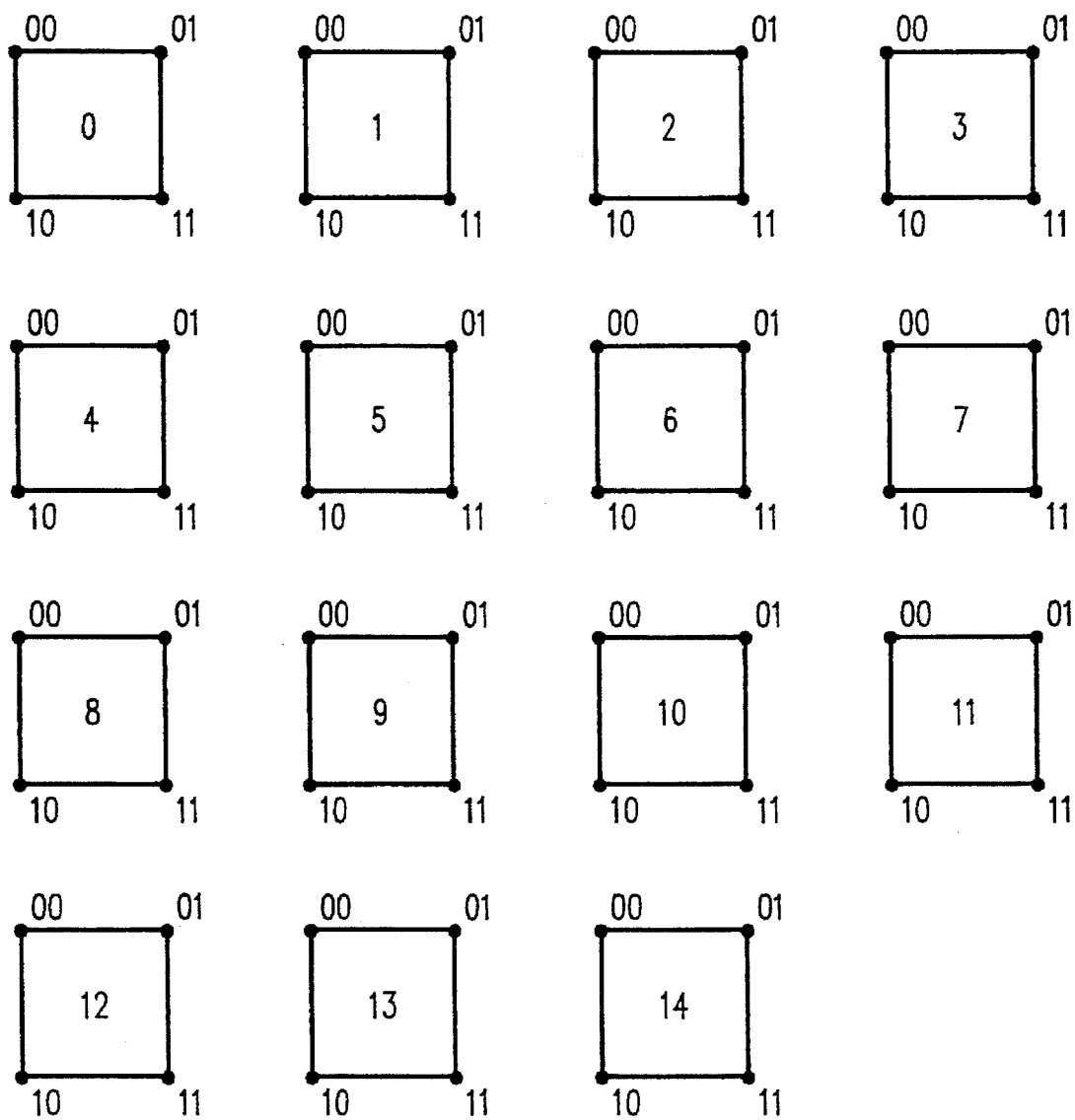
FIG. 4 is an illustration of the application of one step of the preferred embodiment of the method of the present invention wherein each of the individual nodes of the fault-tolerant mesh of FIG. 2 has been expanded to a 2-cube.

Reference is now made to FIG. 4 which is an illustration wherein each of the individual nodes of the fault-tolerant mesh of FIG. 2 has been expanded to a d'-cube wherein d'=2. Each square of the 4 connected nodes in FIG. 4 is a single d'-cube. The label of the node in FIG. 2 corresponding to each d'-cube of FIG. 4 is shown in the center of each d'-cube of FIG. 4. If the selected d' was 3 then the possible hypercube label combinations would be $2^{d'}$ or $2^3$. Thus, the labels would be 000, 001, 010, 011, 100, 101, 110, and 111, or 8 distinct hypercube labels. Thus the expansion would be 8 nodes for each node of the starting FT mesh of d dimensions where $d \geq d'=3$. This resulting mesh is not shown.

Once the nodes of the mesh have been expanded and labeled in accordance with the present method as described above and illustrated in FIG. 4, then, a series of iterations is performed on the nodes of the graph of FIG. 4 given the lists of FIG. 3. Thus, for each dimension i, where $1 \leq i \leq d$, the next step of the preferred embodiment involves connecting up the edges of these nodes to produce a fault-tolerant mesh.

Specifically, for each dimension i, where $1 \leq i \leq d$, and for each ordered pair of nodes in list $L_i$ (of FIG. 3), first define a current d'-cube which corresponds to the first node in the current ordered pair of nodes and define a matching d'-cube which corresponds to the second node in the current ordered pair of nodes. For each node in the current d'-cube, if i>d', then first define a matching node in the matching d'-cube, wherein the matching node has the same label as the node in the current d'-cube. If the node in the current d'-cube is not connected to the matching node in the matching d'-cube, then connect these two nodes to each other.

If $i \leq d'$ and the i-th bit of the label of the node in the current d'-cube equals 1, then first obtain an i-th bit complemented label by complementing the i-th bit of the label of the node of the current d'-cube and define a matching node in the matching d'-cube, wherein the label of the matching node is the i-th bit complemented label obtained in the previous step. If the node in the current d'-cube is not connected to the matching node in the matching d'-cube, then connect these two nodes to each other.

Figure 5:
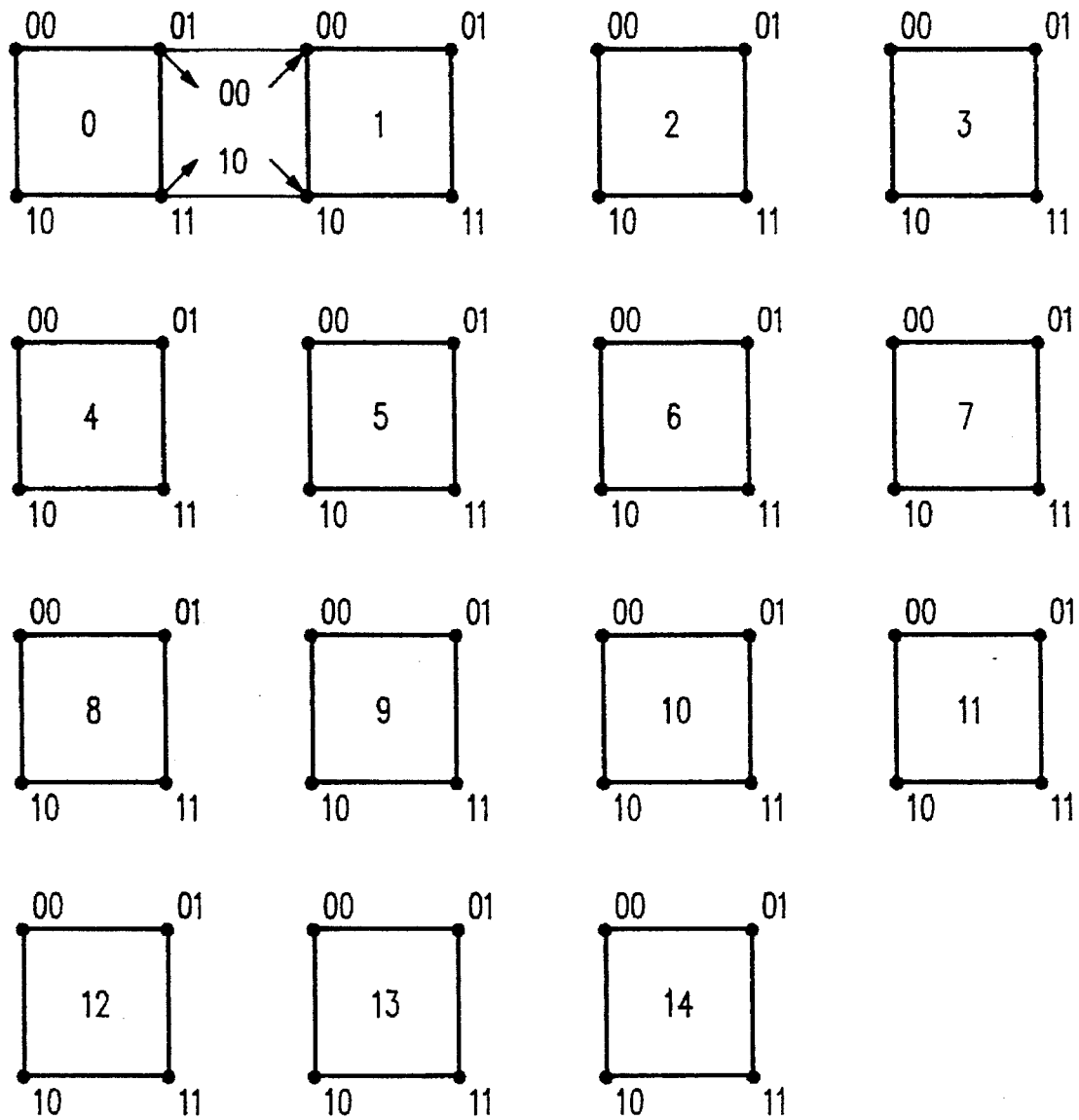
FIG. 5 is an illustration of the application of an additional step of the method of the preferred embodiment of the present invention wherein the connections corresponding to the first ordered pair of nodes of the first list of FIG. 3 have been added to the network of FIG. 4.

Reference is now made to FIG. 5. For the first set of iterations, i=1. Thus for each ordered pair of nodes in list $L_1$ of FIG. 3, a current d'-cube which corresponds to the first node in the current ordered pair of nodes is defined. The first ordered pair of nodes in List 1 is (0,1). The first node in this ordered pair is node 0. The d'-cube of FIG. 5 corresponding to node 0 of FIG. 2 is the upper lefthand d'-cube. The defined matching d'-cube which corresponds to the second node in the current ordered pair of nodes is d'-cube with Label 1 because 1 is the second node in the current ordered pair (0,1) of List 1. This defines the set of d'-cubes for this graph which will be the object of the following iteration.

As discussed, the nodes for d'-cube 0 of the graph of FIG. 5 have the following hypercube labels: 00, 01, 10, and 11, with the right-most bit defined as bit I and the left-most bit defined as bit 2, in other words, the d'=2 bit. For each node in the current d'-cube (i.e., d'-cube 0), the present method tests if i>d'. Since i=1 and d'=2, this test fails. Then the present method tests if i≦d' and tests if the i-th bit of the label of the node in the current d'-cube equals 1. In this example, the i-th bit is the first bit. In the present hypercube labeling scheme of FIGS. 4 and 5, this corresponds to the right-most bit. The rightmost bit of the node labeled 00 in d'-cube 0 of FIG. 5 is 0. Thus, this test also fails and no connection is made for this node on this iteration.

The focus on the next iteration is on node labeled 01 of d'-cube 0. For this node in the current d'-cube, once again the test of whether i>d' evaluates to false because i=1. Thus, this test fails. Next, i< d' and the i-th bit of the label of the node in the current d'-cube, i.e., the right-most bit of node 01, does equal 1. Therefore, an i-th bit complemented label must then be obtained by complementing the 1-st bit of this label. As shown in FIG. 5, the complemented 1-st bit produces a 00 indicated by the directional arrow originating from node 01. The next step involves defining a matching node in the matching d'-cube wherein the label of the matching node is the same as the i-th bit complemented label. Since the matching d'-cube was previously defined as d'-cube 1, the node with a hypercube label matching the i-th bit complemented label is node 00 in d'-cube 1. If this node is not connected to the matching node in the matching d'-cube then the present method involves the step of connecting these two nodes to each other. As shown in FIG. 5 and as a result of the second iteration of the present method, an edge has been connected between node 01 of d'-cube 0 and node 00 of d'-cube 1.

The focus on the next iteration is on node labeled 11 of d'-cube 0. For this node in the current d'-cube, once again the test of whether i>d' evaluates to false because i=1. However, i≦d' and the i-th bit, i.e., the right-most bit of node 11, equals 1. As a result, an i-th bit complemented label must then be obtained by complementing this 1-st bit. As shown in FIG. 5, this produces a 10 because the complemented first bit is 0 which is indicated by the directional arrow originating from node 11 of d'-cube 0. The defined matching node in the matching d'-cube is such that the label of the matching node is the same as the i-th bit complemented label. Since the matching d'-cube was previously defined as d'-cube 1, the node with a hypercube label matching the i-th bit complemented label is node 10 in d'-cube 1. If this node is not connected to the matching node in the matching d'-cube then the present method involves the step of connecting these two nodes to each other. As a result of this iteration of the present method, an edge has been connected between node 11 of d'-cube 0 and node 10 of d'-cube 1.

The focus on this iteration is on node labeled 10 of d'-cube 0. For this node in the current d'-cube, once again the test of whether i> d' evaluates to false because i=1. The i-th bit, i.e., the right-most bit of node 10, equals 0. As a result and similar to node 00, no edges are connected to this node in this iteration.

It should be understood that the first test, i.e., if i>d' will not pass because, for purposes of illustrating the generation of a target mesh T' wherein d'=2, and since 1≦i≦d wherein d=2, d' was chosen to be 2. Since the allowable range for d' is 1≦d'≦d, we could have chosen d' to be equal to 1 and at a point in the iterations, wherein i=2, the test of if i> d' would pass. However, since this is not the case for the present example, this test will not pass.

Figure 6:
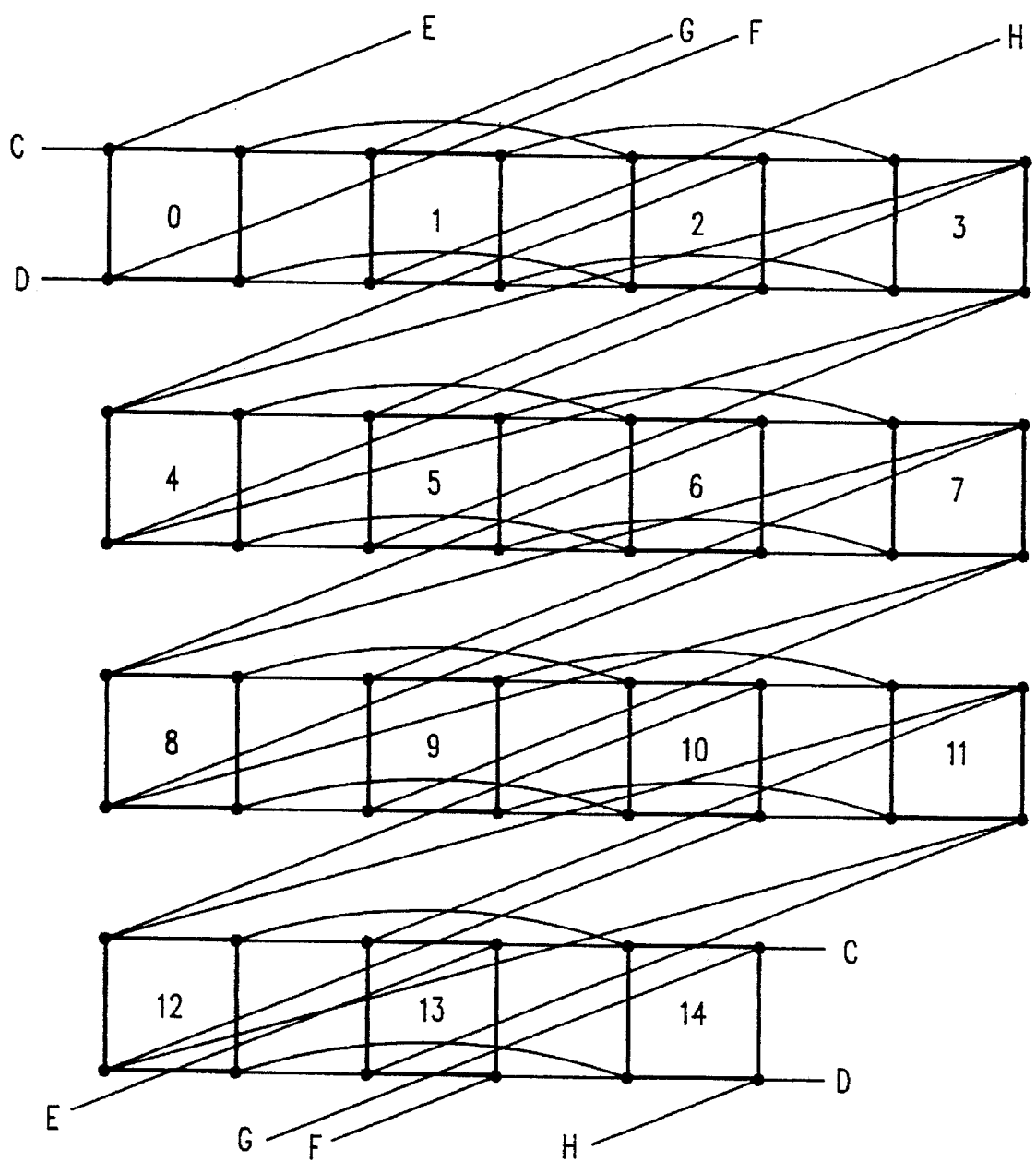
FIG. 6 is an illustration of the application of additional steps of the method of the preferred embodiment of the present invention wherein the connections corresponding to all of the ordered pairs of nodes of the first list of FIG. 3 have been added to the network of FIG. 4.

Reference is now made to FIG. 6. All the connections corresponding to all of the ordered pairs of nodes of the List 1, wherein i=1, of FIG. 3 have been added to the network of FIG. 4. The alphabetic connections are used for clarity of illustration. It should be understood that the edges marked with alphabetic symbols are connected edges, in other words, edge E from node 00 of d'-cube 0 is connected to node 01 of d'-cube 13. Similarly, all the other alphabetic edges are connected.

Figure 7:
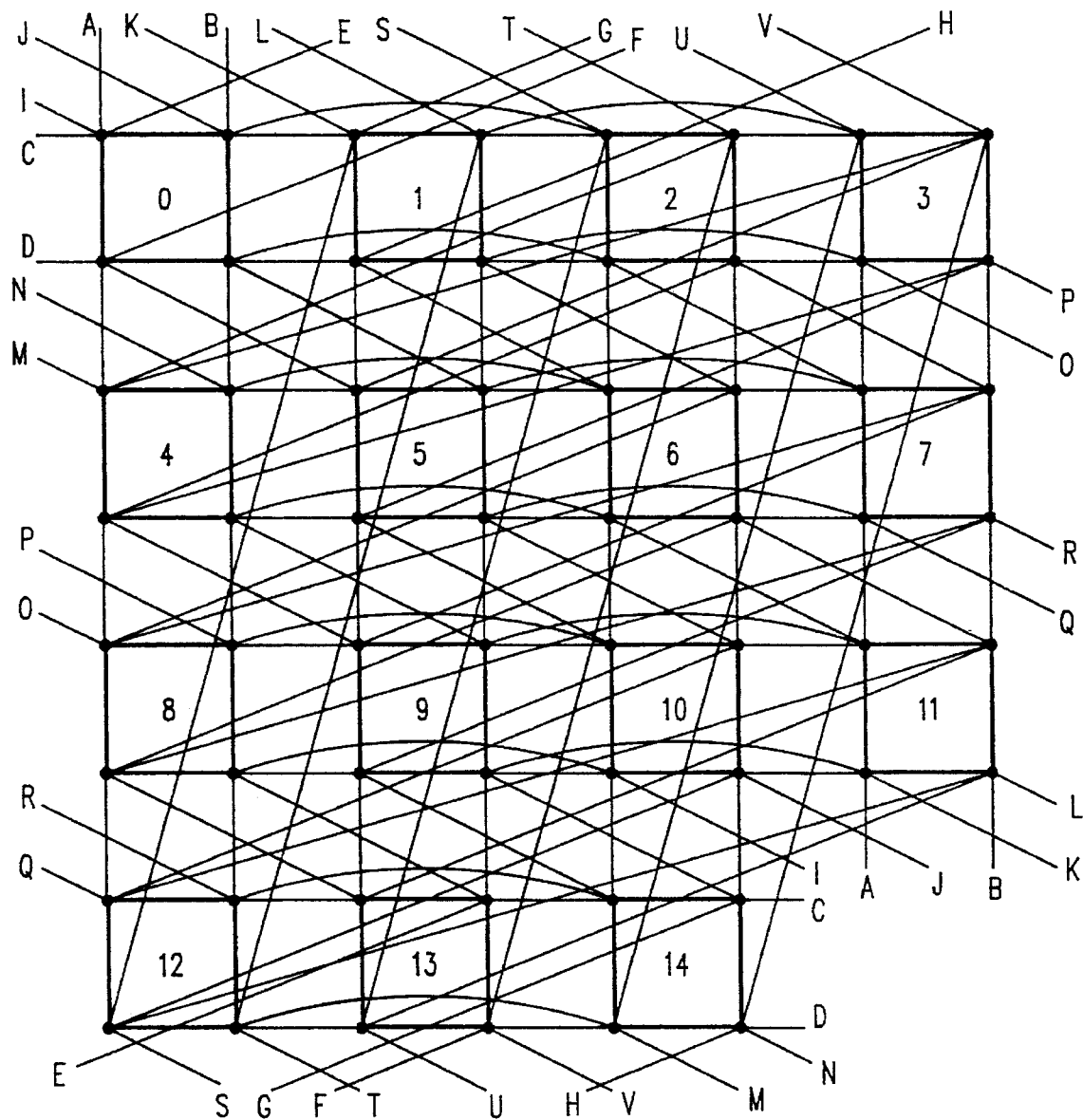
FIG. 7 is diagram of a 3 fault-tolerant (6×8) mesh created by applying the method of the preferred embodiment of the present invention wherein the connections corresponding to all of the ordered pairs of nodes of both lists of FIG. 3 have been added to the network of FIG. 4.

Reference is made to FIG. 7, which is diagram of a 3 fault-tolerant 6×8 mesh created by applying the method of the preferred embodiment wherein all the connections corresponding to all of the ordered pairs of nodes of both lists of ordered pairs of FIG. 3 have been added to the network of FIG. 4. For clarity, the alphabetic edges connect to identically labeled edges. Thus, the method of the present invention generated a fault-tolerant mesh.

Figure 8:
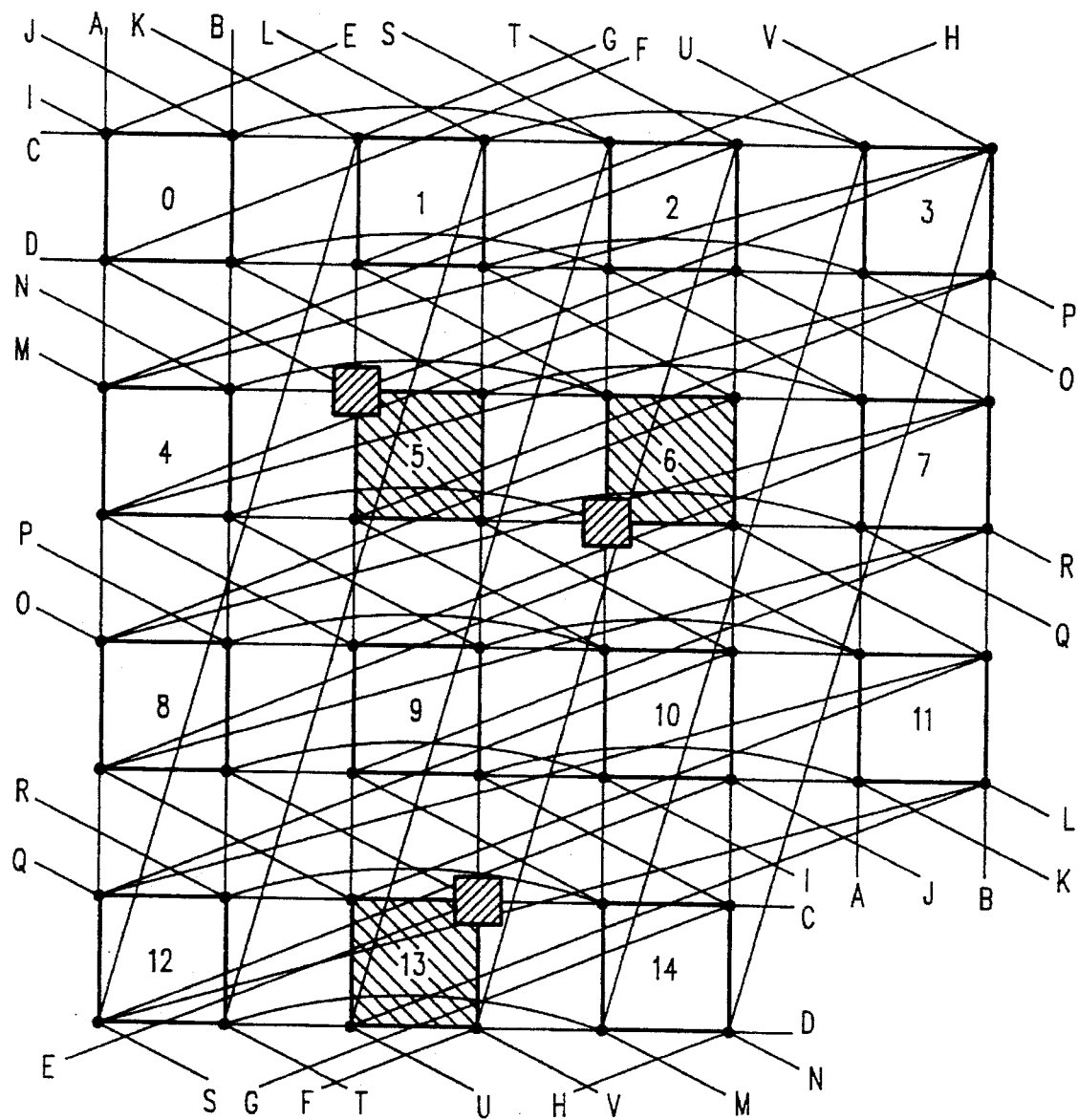
FIG. 8 is a diagram of the 3 fault-tolerant (6×8) mesh of FIG. 7 illustrating 3 faults to the mesh.

In order to show that the above-discussed preferred method of generating a fault-tolerant mesh actually generated a fault-tolerant mesh containing the target mesh of FIG. 14, reference is now made to FIG. 8 which is a diagram of the 3 fault-tolerant 6×8 mesh of FIG. 7 wherein 3 faults have occurred. The solid black squares of FIG. 8 serve to show which nodes have become faulty. For the present example, these three faulty nodes are located in the d'-cubes numbered 5, 6, and 13. The first step in locating the healthy copy of the target mesh of FIG. 14 contained in FIG. 8 is to identify which d'-cubes contain the faults. Once a node has become faulty, in the present invention, all the nodes in the corresponding d'-cubes (5,6,13) of FIG. 8 are treated as being faulty for the purpose of reconfiguration. Therefore, the identified faulty d'-cubes are shown shaded because these d'-cubes contain faulty nodes and will not be used in the reconfigured mesh.

Figure 9:
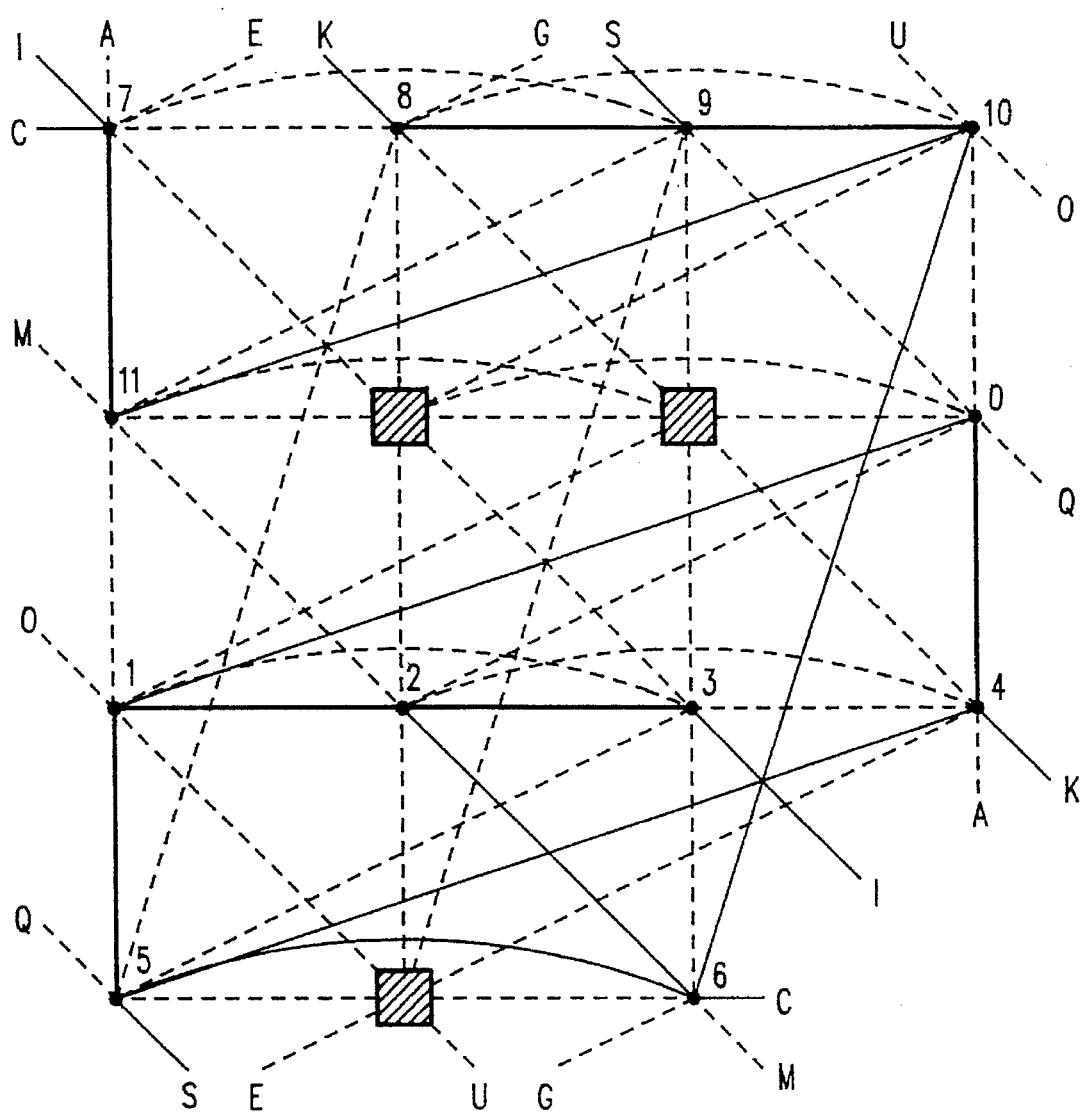
FIG. 9 is a diagram of the fault-tolerant mesh of FIG. 2 with 3 faults corresponding to the faults shown in FIG. 8 wherein the mesh has been reconfigured and re-labeled in accordance with the prior art.

The next step is to go to the original fault tolerant mesh M of FIG. 2 and consider the effect of the faults in that mesh corresponding to the faulty d'-cubes in the mesh M' of FIG. 8. This is shown in FIG. 9 wherein the nodes 5, 6, and 13 in FIG. 2 are marked as faults. These black squares correspond to the d'-cubes in FIG. 8 which contain the faults. The target mesh T of FIG. 1B must then be located in FIG. 9 given the illustrated set of faults. In FIG. 9, the mesh has been reconfigured and re-labeled in accordance with the prior art. As such, the labels 0, 1, 2, 3, . . . 11 are the row-major order labels of the target mesh T contained therein. The heavy lines indicate the edges that are used in that target mesh T and the dotted lines are the ones that are not used. Reference is simultaneously made to FIGS. 9 and 1B. Note that in FIG. 1B an edge connects node 0 with node 1 and node 4. Note that in FIG. 9, an edge connects the node 0 with node 1 and node 4. Similarly, in FIG. 1B an edge connects node 6 with nodes 2, 7, 10, and 5. In FIG. 9, an edge connects node 6 with nodes 2, 10, 7, and 5. Thus, at this point the faults have been mapped back to the original fault-tolerant graph M, the target mesh T has been located within the faulty graph M, and the target mesh has been indicated in row-major labels.

Figure 10:
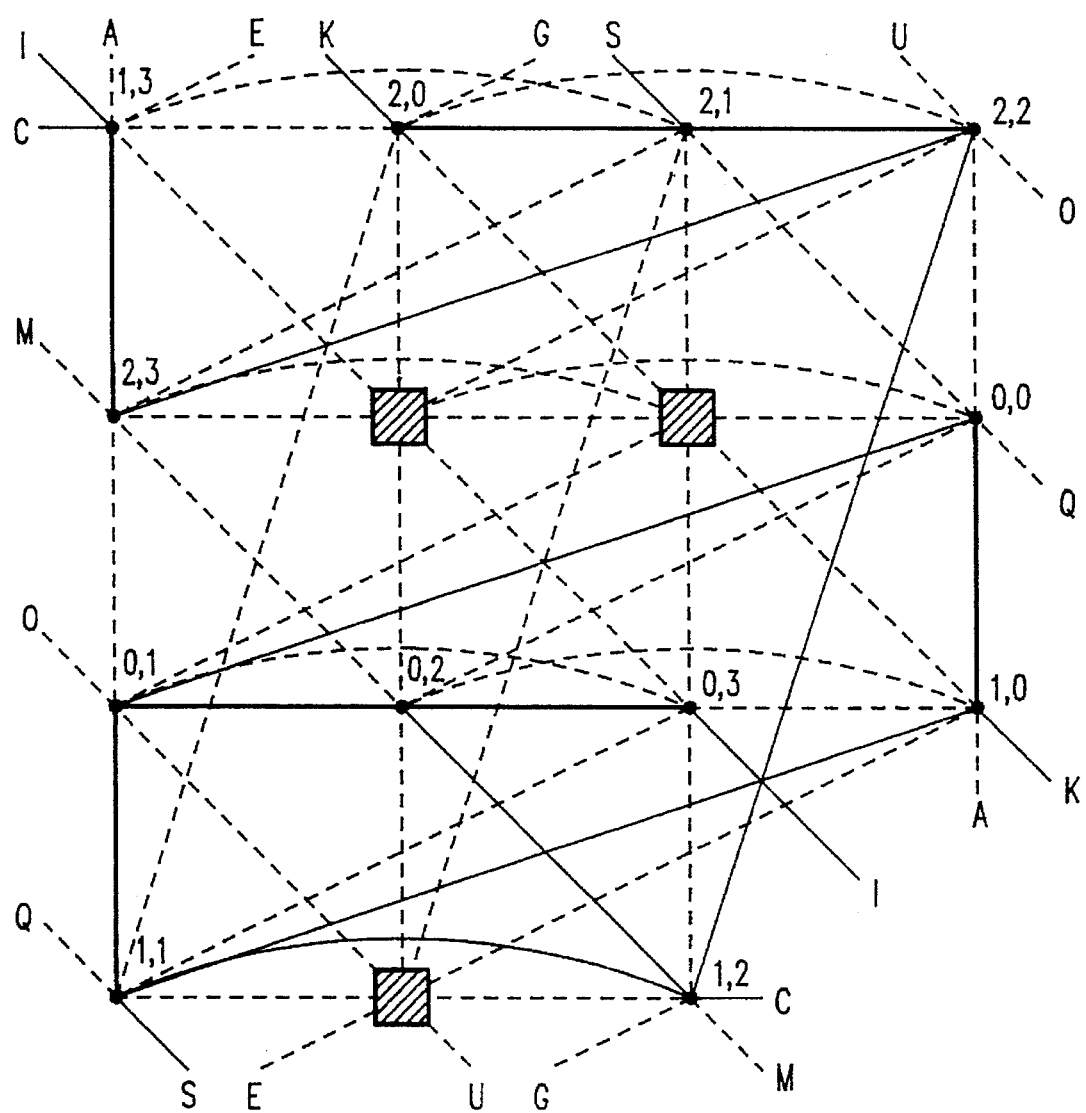
FIG. 10 is a diagram of the faulty mesh of FIG. 9 wherein the row-major labels have been replaced by (row, column) labels.

The labeling of FIG. 9 must next be changed. Reference is now made to FIG. 10 which is a diagram of the faulty mesh of FIG. 9 wherein the row-major labels have been replaced by row, column labels. The labeling has been replaced because, given these row, column labels, we can go back and find the correct labels for the target mesh T' in the new fault tolerant mesh M'. Thus, the node having label 10 of FIG. 9 directly corresponds to the node having label 2,2 in FIG. 10 because node 10 in a row-major ordering is the node in the second row and second column. This can be readily seen in FIG. 1A. Reference is simultaneously made to FIGS. 10 and 1A. In FIG. 1A, an edges connects node 0,0 with node 0,1 and node 1,0. Note that in FIG. 10, an edge connects node 0,0 with node 0,1 and node 1,0. Similarly, node 0,3 of FIG. 1A has edges connecting it to nodes 1,3 and 0,2. In FIG. 10, similar edges connects node 0,3 with nodes 1,3 and 0,2. Once again, the heavy lines indicate the edges that are used in that target mesh T and the dotted lines are the ones that are not used.

Figure 11:
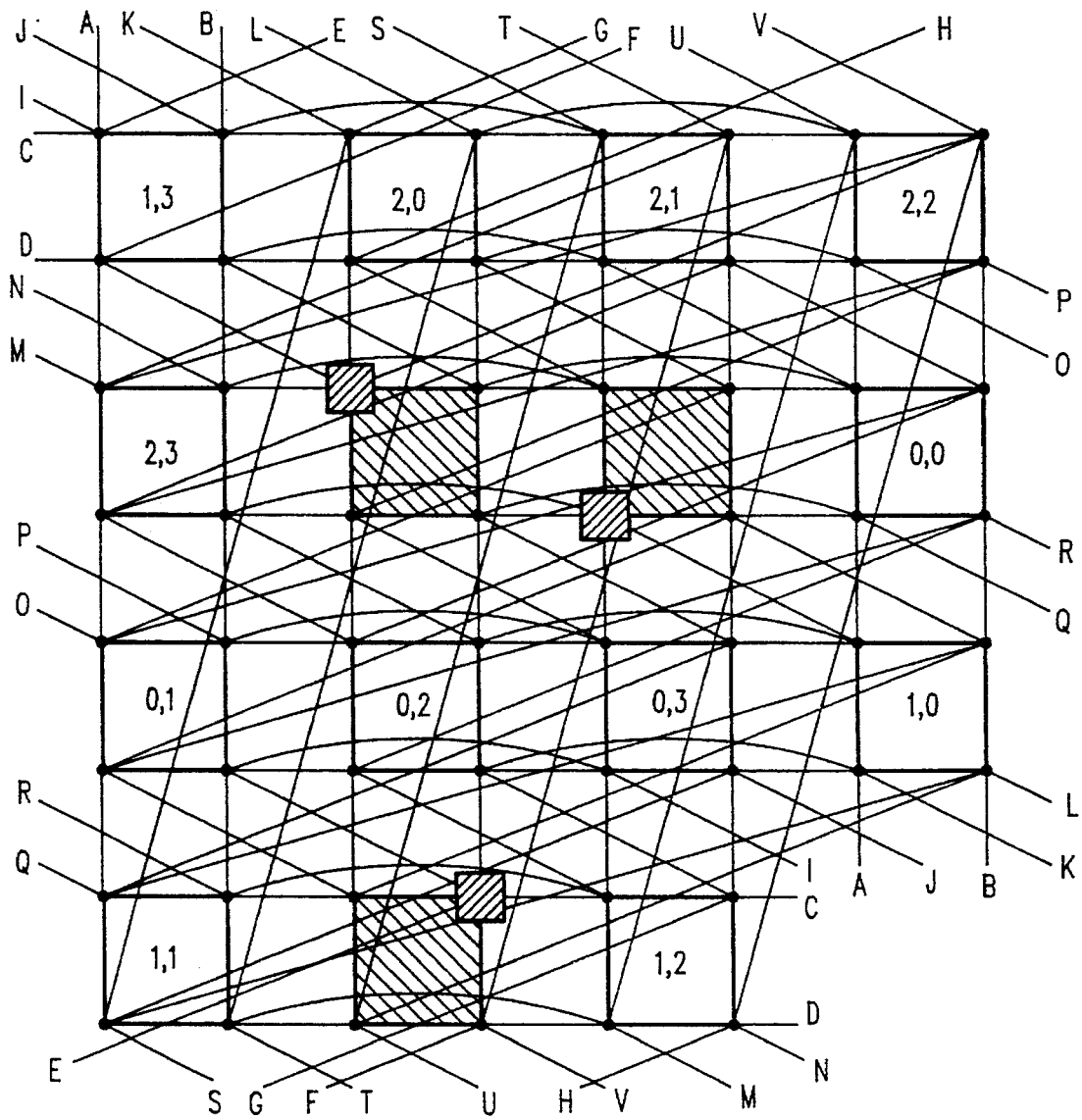
FIG. 11 is a diagram of the fault-tolerant mesh of FIG. 8 wherein the 2-cubes have been re-labeled with (row, column) labels in accordance with the preferred embodiment of the method of the present invention and in accordance to the labels shown in FIG. 10.

The new row, column labeling of the nodes of FIG. 10 must next be assigned to the corresponding d'-cubes. Reference is now made to FIG. 11. In this example, the 1,3 labeling of FIG. 10 gets assigned to the corresponding d'-cube of FIG. 11. Similarly, the 0,0 label gets assigned to the corresponding d'-cube and so on. The shaded d'-cubes containing the faulty nodes are left out of this label assignment because, as discussed, the entire d'-cube is considered faulty. This assignment is a direct result of the one-to-one correspondence between the individual nodes of the original fault tolerant mesh M of FIG. 2 and the generated fault tolerant mesh M' of FIG. 7.

Next, the row, column labels must be assigned to the target mesh T' contained in mesh M'. This is accomplished in a straight-forward manner. For each node in the d'-cube and for each dimension i, where $1 \leq i \leq d$, two situations occur. In the first case where $i \leq d'$ the node's label in dimension i is given by $(2(g)+h)$ wherein g is the dimension i component of the d'-cube labeling of FIG. 11 and h is bit i of the node's d'-bit labeling of FIG. 4. Again, note that in hypercube labeling the first bit is the rightmost bit and the second bit is the next right most bit and so forth. The other case is where $i>d'$ in which the node's label in dimension i has a label of $(g)$ where g is the dimension i component of the d'-cube's label in FIG. 11.

For example, attention is directed to the d'-cubes in the upper lefthand corner of FIGS. 4 and 11. Note that in FIG. 4, the nodes in this d'-cube were labeled as 00, 01, 11, and 10 as shown. Note that in FIG. 11 the upper lefthand d'-cube has a 1,3 label. For each node in the d'-cube in the upper lefthand corner of FIG. 4, in the instance when i=1, i.e., the first dimension of the 2-dimensional graph, each node will have a value of g=3, and when i=2 each node will have a value of g=1 because of the 1,3 labeling of the d'-cube of FIG. 11.

Consider the node in the upper lefthand corner labeled 00. When i=1, the value of g=3, and the value of h=0 because h is the first bit of the 00 hypercube labeling for this node. As a result, the new dimension 1 component, i.e., the column component, of this node's label is $(2g+h)=2(3)+0=6$. When i=2, the value of g=1, and the value of h=0 because h is the second bit of the 00 hypercube labeling. As a result, the new dimension 2 component, i.e., the row component, of this node's label is $(2g+h)=2(1)+0=2$. This result can be seen in FIG. 12 wherein the the upper lefthand node's new label is 2,6.

For the next node, i.e., the node with the 01 hypercube label of FIG. 4, when i=1, the value of g=3, and the value of the h=1 because h is the first bit of the 01 hypercube label. As a result, the new dimension 1 component, i.e., the column component, of this node's label is $(2g+h)=2(3)+1=7$. When i=2, the value of g=1, and the value of h=0 because h is the second bit of the 01 hypercube labeling. As a result, the new dimension 2 component, i.e., the row component, of this node's label is $(2g+h)=2(1)+0=2$. This result can be seen in FIG. 12 wherein the upper lefthand node's new label is 2,7.

For the next node, i.e., the node with the 11 hypercube label of FIG. 4, when i=1, the value of g=3, and the value of h=1 because h is the first bit of the 11 hypercube label. As a result, the new dimension 1 component, i.e., the column component, of this node's label is $(2g+h)=2(3)+1=7$. When i=2, the value of g=1, and the value of h=1 because h is the second bit of the 11 hypercube labeling. As a result, the new dimension 2 component, i.e., the row component, of this node's label is $(2g+h)=2(1)+1=3$. This result can be seen in FIG. 12 wherein the upper lefthand node's new label is 3,7.

For the next node, i.e., the node with the 10 hypercube label of FIG. 4, when i=1, the value of g=3, and the value of h=0 because h is the first bit of the 10 hypercube label. As a result, the new dimension 1 component, i.e., the column component, of this node's label is $(2g+h)=2(3)+0=6$. When i=2, the value of g=1, and the value of h=1 because h is the second bit of the 10 hypercube labeling. As a result, the new dimension 2 component, i.e., the row component, of this node's label is $(2g+h)=2(1)+1=3$. This result can be seen in FIG. 12 wherein the corresponding node's new label is 3,6.

Figure 12:
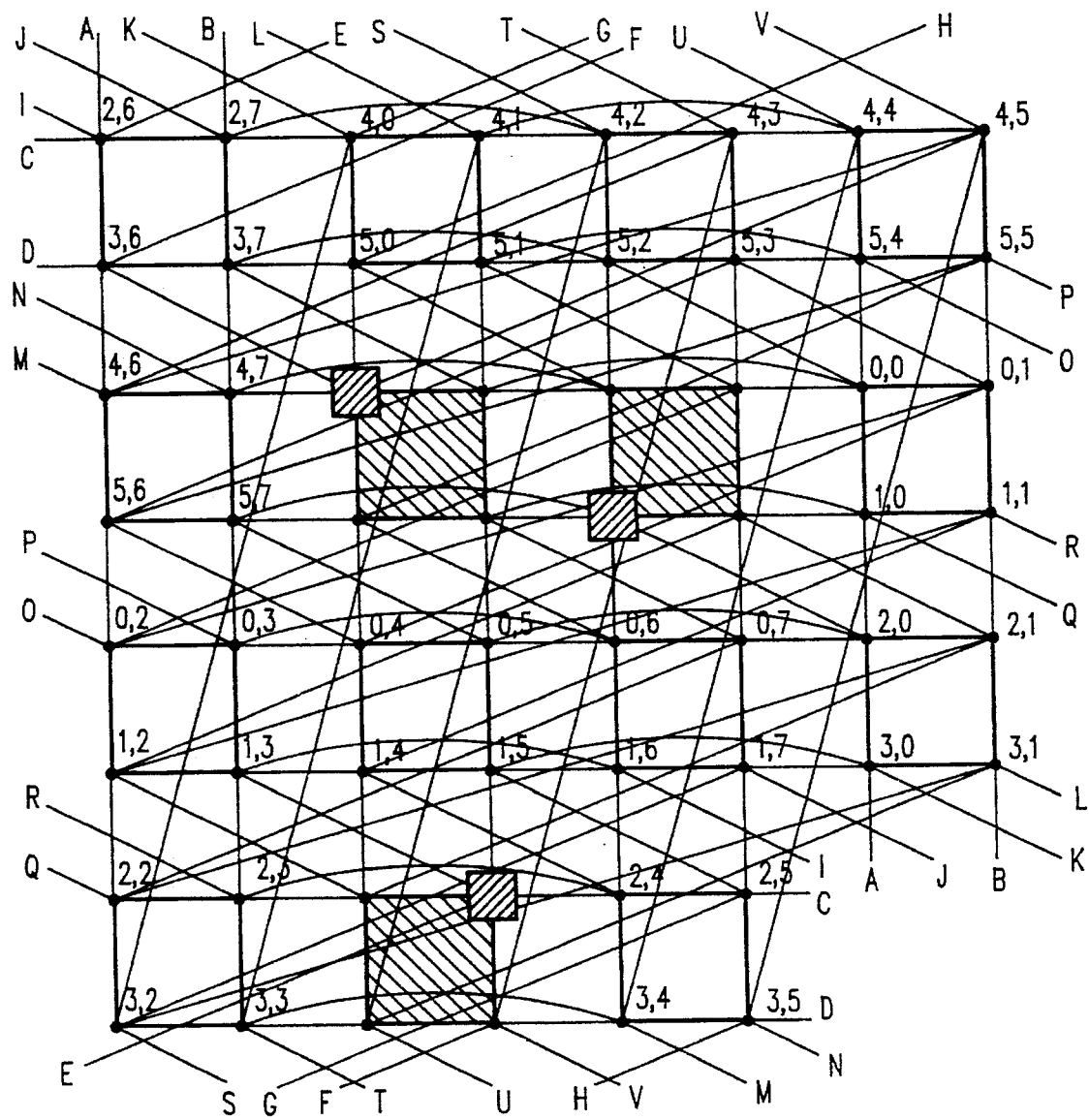
FIG. 12 is a diagram of the fault-tolerant mesh of FIG. 11 wherein the nodes have been relabeled with (row, column) labels in accordance with the preferred embodiment of the method of the present invention.
Figure 13:
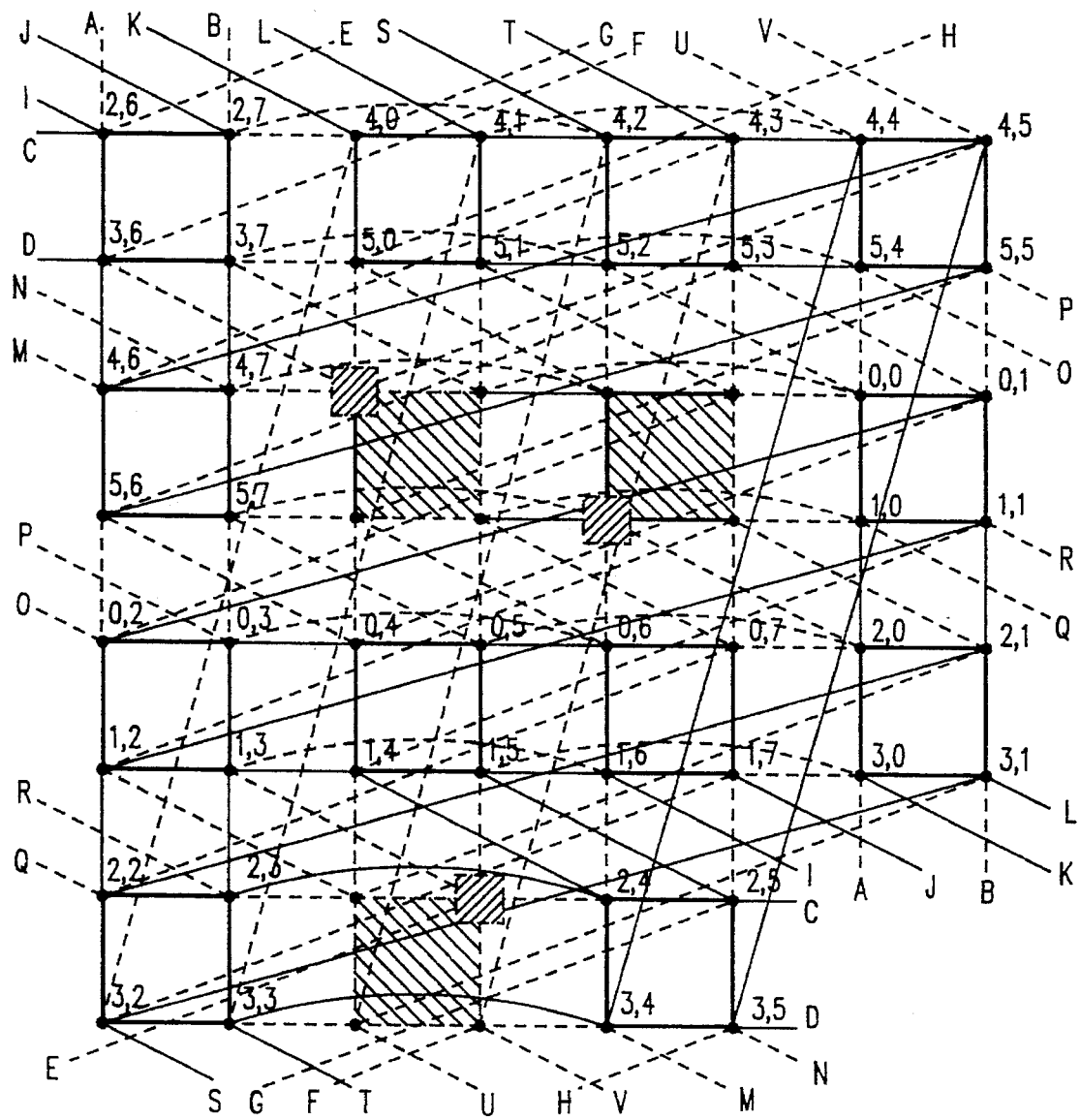
FIG. 13 is a diagram of the fault-tolerant mesh of FIG. 12 wherein the solid lines indicate the edges which are used and the broken lines indicate the edges which are not.

If the above labeling scheme is iterated for all the nodes in all the dimensions the result is the relabeled fault tolerant mesh of FIG. 12. To better see the mesh structure, reference is made to FIG. 13 which is a diagram of the fault-tolerant mesh of FIG. 12 wherein the solid lines indicate the edges which are used and the broken lines indicate the edges which are not.

Reference is now made to FIG. 14 which is a diagram of the 6×8 target mesh labeled with row, column labels. Note that by comparing the labeling of the nodes of FIGS. 13 and 14, it can be shown that all of the edges in the fault tolerant mesh of FIG. 14 are present and highlighted by thick solid lines in the fault tolerant mesh of FIG. 13. Therefore, and as a result of the present method the desired target mesh has been located in the present of faults as given by the above-described example.

As a result of the above-discussed and illustrated examples of the relabeling of the present method, it has been demonstrated that the fault-tolerant mesh M' of FIG. 7 can tolerate the specific configuration of faults that were illustrated in FIG. 8. It should be understood and appreciated that the above relabeling technique can be applied to reconfigure and relabel the fault-tolerant mesh M' in the presence of any fault configuration consisting of up to three faults because the original fault-tolerant mesh M of FIG. 2 can tolerate any fault configuration consisting of up to three faults. Therefore, the present method has generated a new fault-tolerant mesh architecture that can sustain a large number of fault configurations and still be reconfigured and relabeled as a healthy mesh-connected architecture. Because this healthy mesh connected architecture is present in the generated fault-tolerant mesh, numerous algorithms specifically designed for mesh architectures can be implemented in the present of faults with little or no slowdown.

Furthermore, the fault-tolerant mesh M' of FIG. 7 can tolerate any fault configuration of three or fewer faults and yet has degree 6 and only 12 spare nodes. Because the enlarged fault-tolerant mesh generated by the present method has only 12 spare nodes and has a degree of 6, the present method reduces the cost of the generated mesh. It should be noted that the presented fault-tolerant mesh can tolerate up to k instances of d'-cubes, which may cover more than k faults. That is, if multiple faults occur in the same d'-cube, they can be treated as just one fault.

It should be understood and appreciated that the present method is not limited to the fault-tolerant mesh M as input discussed above. In particular, any fault-tolerant mesh M for which $L_i$ and $L_j$ has no or nearly no interaction wherein i≠j, are good candidates as input fault-tolerant meshes to the present method for generating a fault-tolerant mesh M' with smaller degree.

In addition, it should be understood and appreciated by one skilled in this art that the present method is equally applicable and extendable to other mesh-like structures such as an 8-connected 2-dimensional mesh, i.e., a mesh wherein each node has edges connecting to its diagonal and anti-diagonal neighbors, as well as to its horizontal and vertical neighbors, provided they exist. In this regard and to help illustrate, one could extend the present method to generate a fault tolerant 8-connected 2-dimensional mesh by first creating a list $L_i$ corresponding to each of the four types of edges, i.e., horizontal, vertical, diagonal, and anti-diagonal, rather than the above-discussed two lists corresponding only to the horizontal and vertical edges. Secondly, the newly generated fault-tolerant mesh M' would be composed of blocks of four nodes each, in which each node of these four nodes is connected to the three other nodes rather than the 2-cubes (i.e., square of four nodes). The step of connecting these blocks of four nodes would be such that these connections would then be made so as to be consistent with the pattern of the 8-connected 2-dimensional mesh.

In summary, the present invention is directed to a method for generating fault-tolerant d-dimensional mesh architectures. The resulting fault tolerant mesh architecture can sustain a large number of fault configurations and still contain a healthy mesh-connected architecture. The present method can easily be reconfigured in the presence of faults without the use of switches. It is advantageous that the present method can be generalized for use in parallel computers, other parallel architectures, array of chips on boards, WSI arrays, memory chips, and the like.

This invention may be embodied in other specific forms without departing from its spirit or essential characteristics. The above-described embodiments of the present invention are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is claimed and desired to be secured by United States Letters Patent is:

1. A method for configuring a fault-tolerant target mesh M' from a multiprocessor network, the multiprocessor network having components including a plurality of processor nodes and interconnections therebetween, the components being either healthy or faulty, the multiprocessor network being configured topologically as a d-dimensional fault-tolerant physical mesh M, such that the fault-tolerant target mesh M' is to be configured of healthy components of the multiprocessor network, the method comprising the steps of:

a) creating a plurality of respective blocks of nodes in the mesh M' corresponding to respective ones of the nodes in M, the nodes in the blocks of nodes having bit labels;

b) adding edges within each said block of nodes;

c) adding edges between the nodes in the different blocks of nodes in the target mesh M' corresponding to the edges in M, based on the bit labels of the nodes in the different blocks, and based on complements of bits of the bit labels of the nodes in the different blocks; and d) configuring the physical mesh M as per the added edges.

2. A method as defined in claim 1 wherein the edges added in step (b) form an identical connection pattern in each of said blocks of nodes.

3. A method for configuring a fault-tolerant target mesh M' from a multiprocessor network, the multiprocessor network having components including a plurality of processor nodes and interconnections therebetween, the components being either healthy or faulty, the multiprocessor network being configured topologically as a d-dimensional fault-tolerant physical mesh M, such that the fault-tolerant target mesh M' is configured of healthy components of the multiprocessor network, the method comprising the steps of:

a) selecting a dimension d', where $1 \leq d' \leq d$;

b) creating a respective block of $2^{d'}$ nodes in the target mesh M' corresponding to each respective one of the nodes in M, the nodes in the blocks of nodes having bit labels;

c) adding edges within said blocks of $2^{d'}$ nodes;

d) for each edge in M, adding edges in the target mesh M' that link nodes located in the blocks corresponding to the nodes connected by said edge in M, based on the bit labels of the nodes in the different blocks, and based on complements of bits of the bit labels of the nodes in the different blocks; and e) configuring the physical mesh M as per the added edges.

4. A method as defined in claim 3 wherein the edges added in step (c) correspond to those edges present in a block.

5. A method as defined in claim 3 wherein the edges added in step (c) comprise the edges present in a block and diagonal and anti-diagonal edges.

6. A multiprocessor network comprising:

a plurality of processor nodes;

an interconnection network coupled between the processor nodes, the interconnection network including a plurality of respective edges, each respective edge being coupled between a respective pair of the nodes; and means for defining a fault-tolerant mesh from the nodes and the interconnection network, the fault-tolerant mesh being given by parameters n, d, d', and $S_1, S_2, \ldots, S_d$, where n, d, and d' are positive integers, where $1 \leq d' \leq d$, and where each $S_i$, where $1 \leq i \leq d$, is a subset of $\{1, 2, \ldots, n-1\}$, the means for defining including means for defining a set of n labeled d'-cubes numbered 0 through n-1, (i) wherein each node with d'-cube label $(x_1, x_2, \ldots, x_{d'})$ in d'-cube j, where $0 \leq j \leq n-1$, is connected to node $(x_1, x_2, \ldots, x_{i-1}, \text{complement}(x_i), x_{i+1}, \ldots, x_{d'})$ in d'-cube $(j+(2x_i-1)s)$ mod n, where $s \in S_i$ and $1 \leq i \leq d'$, and (ii) wherein each node with d'-cube label $(x_1, x_2, \ldots, x_{d'})$ in d'-cube j, where $0 \leq j \leq n-1$, is further connected to node $(x_1, x_2, \ldots, x_{d'})$ in d'-cube $(j+s)$ mod n, where $s \in S_i$ and $d' \leq i \leq d$.

7. A computer program product: for use on a computer system, for generating a fault-tolerant target mesh M' from a multiprocessor network, the multiprocessor network having components including a plurality of processor nodes and interconnections therebetween, the components being either healthy or faulty, the multiprocessor network being configured topologically as a d-dimensional fault-tolerant physical mesh M, such that the fault-tolerant target mesh M' is to be configured of healthy components of the multiprocessor network, the computer program product comprising:

a) a recording medium;

b) means recorded on said recording medium for instructing said computer system to create a plurality of respective blocks of nodes in the mesh M' corresponding to respective ones of the nodes in M, the nodes in the blocks of nodes having bit labels;

c) means recorded on said recording medium for instructing said computer system to add edges within each said block of nodes;

d) means recorded on said recording medium for instructing said computer system to add edges between the nodes in the different blocks of nodes in the target mesh M' corresponding to the edges in M, based on the bit labels of the nodes in the different blocks, and based on complements of bits of the bit labels of the nodes in the different blocks; and e) configuring the physical mesh M as per the added edges.

8. A computer program product as defined in claim 7 wherein the means for instructing to add edges within each said block of nodes includes means recorded on said recording medium for instructing said computer system to add edges which form an identical connection pattern in each of said blocks of nodes.

9. A computer program product for use on a computer system for generating a fault-tolerant target mesh M' from a multiprocessor network, the multiprocessor network having components including a plurality of processor nodes and interconnections therebetween, the components being either healthy or faulty, the multiprocessor network being configured topologically as a d-dimensional fault-tolerant physical mesh M, such that the fault-tolerant target mesh M' is configured of healthy components of the multiprocessor network, the computer program product comprising:

a) a recording medium;

b) means recorded on said recording medium for instructing said computer system to select a dimension d', where $1 \leq d' \leq d$;

c) means recorded on said recording medium for instructing said computer system to create a respective block of $2^{d'}$ nodes in the mesh M' corresponding to each respective node in M, the nodes in the blocks of nodes having bit labels;

d) means recorded on said recording medium for instructing said computer system to add edges within said blocks of $2^{d'}$ nodes;

e) means, recorded on said recording medium, for instructing said computer system, for each edge in M, to add edges in M' that link nodes located in the blocks corresponding to the nodes connected by said edge in M, based on the bit labels of the nodes in the different blocks, and based on complements of bits of the bit labels of the nodes in the different blocks; and f) configuring the physical mesh M as per the added edges.

10. A computer program product as defined in claim 9 wherein the means d) for instructing to add edges includes means, recorded on said recording medium, for instructing aid computer system to add edges which correspond to edges present in a block.

11. A computer program product as defined in claim 9 wherein the means d) for instructing to add edges includes means, recorded on said recording medium, for instructing said computer system to add edges which comprise edges present in a block and diagonal and anti-diagonal edges.

* * * * *

UNITED STATES PATENT AND TRADEMARK OFFICE
CERTIFICATE OF CORRECTION

PATENT NO. : 5,513,313
DATED : 04/30/96
INVENTOR(S) : J. Bruck, R. E. Cypher and C. T. Ho It is certified that error appears in the above-indentified patent and that said Letters Patent is hereby corrected as shown below:

On the title page, item [56]:
Under "U.S. Patent Documents", add --

| | | | |
|---|---|---|---|
| 5,134,690 | 7/92 | Samatham | 395/200 |
| 5,133,073 | 7/92 | Jackson et al. | 395/800 |
| 5,038,386 | 8/91 | Li | 382/49 |
| 5,020,059 | 5/91 | Gorin et al. | 371/11.3 |
| 4,875,207 | 10/89 | Van Twist et al. | 370/85.12 -- |

Under "Foreign Patent Documents", add --

| | |
|---|---|
| 2583943 | France . |
| 113272 | European Pat. Off.. -- |

UNITED STATES PATENT AND TRADEMARK OFFICE
CERTIFICATE OF CORRECTION

PATENT NO.   : 5,513,313
DATED        : 04/30/96
INVENTOR(S)  : J. Bruck, R. E. Cypher and C. T. Ho It is certified that error appears in the above-indentified patent and that said Letters Patent is hereby corrected as shown below:

On the title page, item [56]:

Under "Other Publications", add --

Banerjee et al., Algorithm-Based Fault Tolerance on a Hypercube Multi-processor, Vol. 39, No. 9, September 1990, IEEE Transactions in Computers, pp. 1132-1145. --

Signed and Sealed this

Twenty-fourth Day of June, 1997

Attest:

BRUCE LEHMAN

*Attesting Officer*        *Commissioner of Patents and Trademarks*